United States Patent
Wittek et al.

(10) Patent No.: US 8,404,150 B2
(45) Date of Patent: *Mar. 26, 2013

(54) LIQUID-CRYSTALLINE MEDIUM AND LIQUID-CRYSTAL DISPLAY

(75) Inventors: Michael Wittek, Darmstadt (DE); Markus Czanta, Darmstadt (DE); Atsutaka Manabe, Bensheim (DE); Lars Lietzau, Darmstadt (DE); Marcus Reuter, Darmstadt (DE); Brigitte Schuler, Grossostheim (DE); Elisabeth Meyer, Langenselbold (DE)

(73) Assignee: Merck Patent GmbH, Darmstadt (DE)

( * ) Notice: Subject to any disclaimer, the term of this patent is extended or adjusted under 35 U.S.C. 154(b) by 137 days.

This patent is subject to a terminal disclaimer.

(21) Appl. No.: 12/867,571

(22) PCT Filed: Jan. 23, 2009

(86) PCT No.: PCT/EP2009/000437
§ 371 (c)(1), (2), (4) Date: Aug. 13, 2010

(87) PCT Pub. No.: WO2009/100810
PCT Pub. Date: Aug. 20, 2009

(65) Prior Publication Data
US 2010/0314582 A1   Dec. 16, 2010

(30) Foreign Application Priority Data
Feb. 15, 2008  (DE) .................. 10 2008 009 409

(51) Int. Cl.
C09K 19/00 (2006.01)
C09K 19/06 (2006.01)
C09K 19/12 (2006.01)
C09K 19/30 (2006.01)
G02F 1/13 (2006.01)

(52) U.S. Cl. ........... 252/299.6; 252/299.01; 252/299.66; 252/299.61; 252/299.63; 252/299.64; 252/299.65; 428/1.1; 428/1.3; 349/1; 349/182

(58) Field of Classification Search ............ 252/299.01, 252/299.6, 299.61, 299.63, 299.64, 299.66; 428/1.1, 1.3; 349/1, 182
See application file for complete search history.

(56) References Cited

U.S. PATENT DOCUMENTS

| 6,007,740 | A | 12/1999 | Andou et al. |
| 2003/0213935 | A1 | 11/2003 | Heckmeier et al. |
| 2004/0242905 | A1 | 12/2004 | Poetsch et al. |
| 2006/0278850 | A1 | 12/2006 | Czanta et al. |
| 2007/0269614 | A1 | 11/2007 | Heckmeier et al. |
| 2008/0132716 | A1 | 6/2008 | Lietzau et al. |
| 2010/0308267 | A1 * | 12/2010 | Wittek et al. ............ 252/299.61 |

FOREIGN PATENT DOCUMENTS

| DE | 102 43 776 A1 | 4/2003 |
| EP | 0 844 229 A1 | 5/1998 |
| EP | 1 482 018 A1 | 12/2004 |
| EP | 1 813 662 A1 | 8/2007 |
| EP | 1 900 792 A1 | 3/2008 |
| WO | WO 2008/019743 A1 | 2/2008 |

OTHER PUBLICATIONS

International Search Report of PCT/EP2009/000437 (Apr. 1, 2009).

* cited by examiner

Primary Examiner — Geraldina Vlsconti
(74) Attorney, Agent, or Firm — Millen, White, Zelano & Branigan, P.C.

(57) ABSTRACT

The present invention relates to dielectrically positive liquid-crystalline media comprising one or more compounds of the formula I

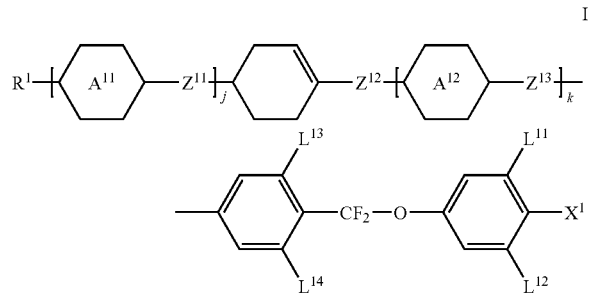

in which the parameters have the meaning indicated in the specification, and optionally one or more compounds selected from the group of the compounds of the formulae II and III

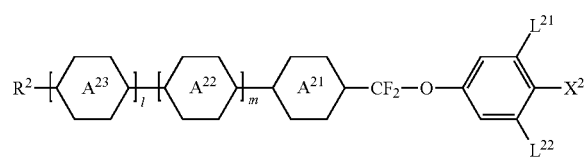

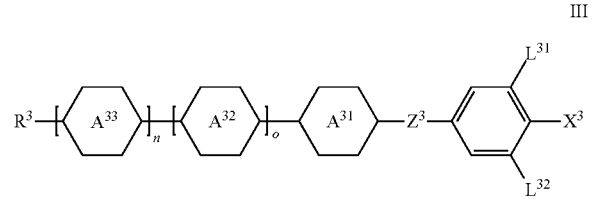

in which the parameters have the meaning indicated in the specification, and optionally one or more compounds of the formula IV

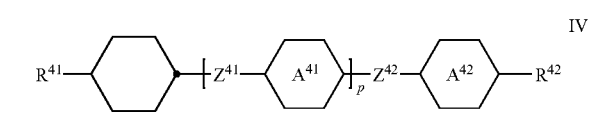

in which the parameters have the meaning indicated in the specification, and to liquid-crystal displays containing these media, especially to active-matrix displays and in particular to TN, IPS and FFS displays.

13 Claims, No Drawings

LIQUID-CRYSTALLINE MEDIUM AND LIQUID-CRYSTAL DISPLAY

FIELD OF THE INVENTION

The present invention relates to liquid-crystalline media and to liquid-crystal displays containing these media, especially to displays addressed by an active matrix and in particular to displays of the twisted nematic (TN), in-plane switching (IPS) or fringe-field switching (FFS) type.

STATE OF THE ART AND PROBLEM TO BE SOLVED

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which is substantially perpendicular to the substrates or the liquid-crystal layer. Besides these modes, there are also electro-optical modes that utilise an electric field which is substantially parallel to the substrates or the liquid-crystal layer, such as, for example, the in-plane switching (IPS) mode (as disclosed, for example, in DE 40 00 451 and EP 0 588 568) and the fringe field switching (FFS) mode, in which a strong "fringe field" is present, i.e. a strong electric field close to the edge of the electrodes and, throughout the cell, an electric field which has both a strong vertical component and a strong horizontal component. These latter two electro-optical modes in particular are used for LCDs in modern desk-top monitors and are intended for use in displays for TV sets and multi-media applications. The liquid crystals according to the present invention are preferably used in displays of this type. In general, dielectrically positive liquid-crystalline media having rather lower values of the dielectric anisotropy are used in FFS displays, but in some cases liquid-crystalline media having a dielectric anisotropy of only about 3 or even less are also used in IPS displays.

For these displays, novel liquid-crystalline media having improved properties are required. The addressing times in particular have to be improved for many types of application. Thus, liquid-crystalline media having lower viscosities (η), especially having lower rotational viscosities ($\gamma_1$), are required. The rotational viscosity should be 80 mPa·s or less, preferably 60 mPa·s or less and especially 55 mPa·s or less.

Besides this parameter, the media must have a nematic phase range of suitable width and position and an appropriate birefringence (Δn), and the dielectric anisotropy (Δ∈) should be sufficiently high to allow a reasonably low operating voltage. Δ∈ should preferably be greater than 2 and very preferably greater than 3, but preferably not greater than 15 and in particular not greater than 12, as this would prevent an at least fairly high resistivity.

The displays according to the present invention are preferably addressed by an active matrix (active matrix LCDs, AMDs for short), preferably by a matrix of thin film transistors (TFTs). However, the liquid crystals according to the invention can also advantageously be used in displays having other known addressing means.

There are numerous different display modes which use composite systems of low-molecular-weight liquid-crystal materials together with polymeric materials. These are, for example, polymer dispersed liquid crystal (PDLC), nematic curvilinearly aligned phase (NCAP) and polymer network (PN) systems, as disclosed, for example, in WO 91/05 429, or axially symmetric microdomain (ASM) systems and others. In contrast to these, the modes that are especially preferred in accordance with the present invention use the liquid-crystal medium as such, oriented on surfaces. These surfaces are typically pretreated in order to achieve uniform alignment of the liquid-crystal material. The display modes according to the present invention preferably use an electric field which is substantially parallel to the composite layer.

Liquid-crystal compositions which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521. However, these compositions have severe disadvantages. Amongst other deficiencies, most of them result in disadvantageously long addressing times, have inadequate values of the resistivity and/or require excessively high operating voltages.

Thus, there is a considerable need for liquid-crystalline media having suitable properties for practical applications, such as a broad nematic phase range, suitable optical anisotropy Δn corresponding to the display type used, a high Δ∈ and particularly low viscosities.

PRESENT INVENTION

Surprisingly, it has now been found that it is possible to achieve liquid-crystalline media having a suitably high Δ∈, a suitable phase range and Δn which do not exhibit the disadvantages of the materials from the prior art, or at least only do so to a significantly lesser extent.

These improved liquid-crystalline media according to the present application comprise at least the following components:
  a dielectrically positive component, component A,
    comprising one or more dielectrically positive compounds of the formula I

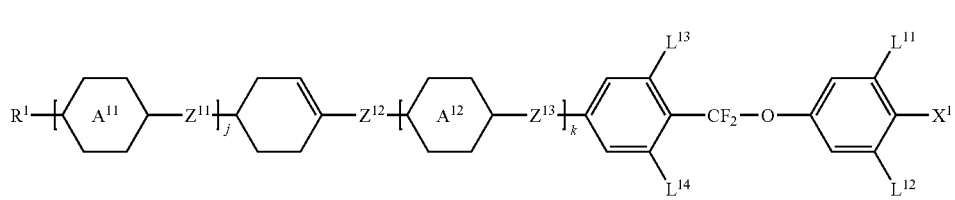

in which $R^1$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl, $X^1$ denotes —CN, halogen, halogenated alkyl or halogenated alkoxy having 1 to 3 C atoms or halogenated alkenyl or halogenated alkenyloxy having 2 or 3 C atoms, preferably F, Cl, —OCF$_3$, —CF$_3$ or —O—CH═CF$_2$, more preferably F, Cl or —OCF$_3$ and very preferably F,

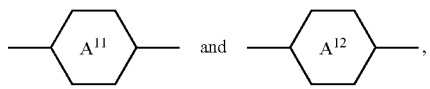

independently of one another and,
if the rings $A^{11}$ and/or $A^{12}$ are present more than once, also these independently of one another, denote

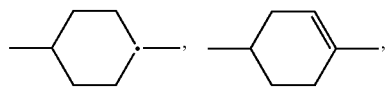

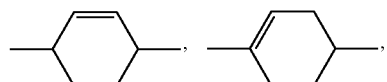

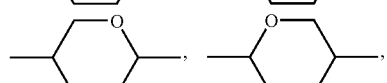

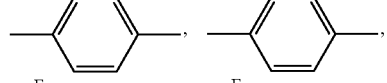

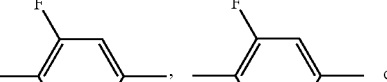

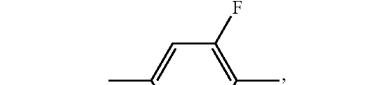

preferably

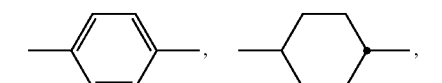

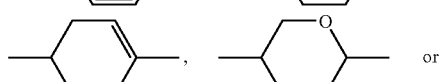

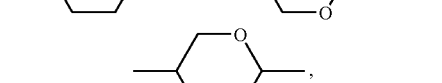

particularly preferably

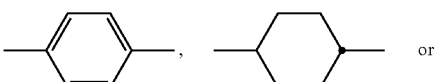

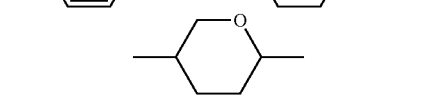

and very
particularly preferably

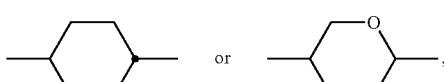

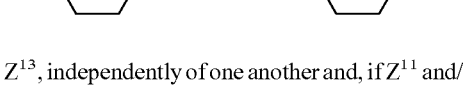

$Z^{11}$ to $Z^{13}$, independently of one another and, if $Z^{11}$ and/or $Z^{13}$ are present more than once, also these independently of one another, denote —CH$_2$CH$_2$—, —CF$_2$CF$_2$—, —COO—, trans-CH═CH—, trans-CF═CF—, —CH$_2$O—, —CF$_2$O— or a single bond, preferably —CH$_2$CH$_2$—, —COO—, trans-CH═CH— or a single bond and very preferably a single bond, $L^{11}$ to $L^{14}$, independently of one another, denote H, F or Cl, preferably H or F, preferably two or more of $L^{11}$ to $L^{14}$ denote F, preferably $L^{11}$ and/or $L^{13}$ denote F and very preferably all of them denote F, and j and k, independently of one another, denote 0, 1 or 2, but where (j+k) denotes 0, 1 or 2, preferably 0 or 1 and particularly preferably 1, and optionally one or more compounds selected from the group of the compounds of the formulae II and III:

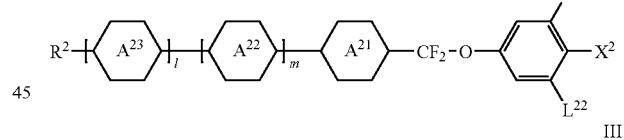

in which $R^2$ and $R^3$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and $R^2$ and $R^3$ preferably denote alkyl or alkenyl,

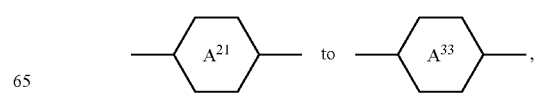

independently of one another, denote

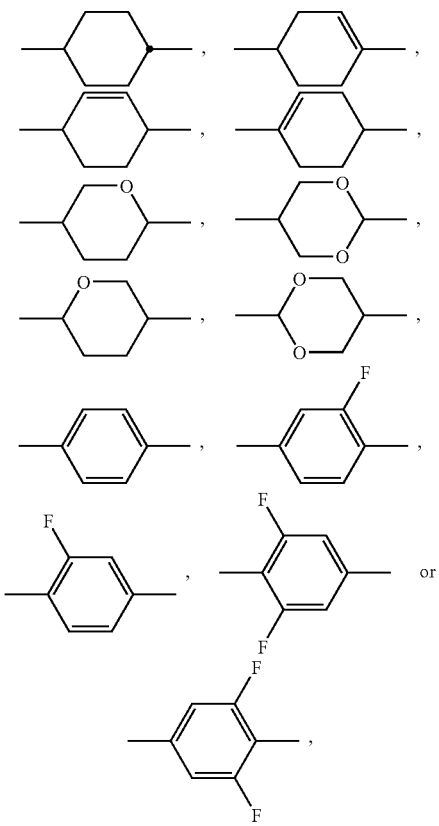

preferably

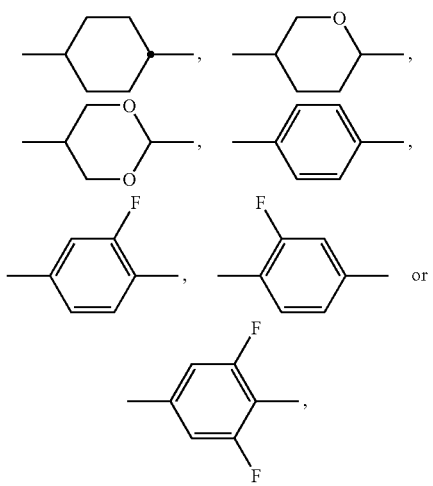

$L^{21}$, $L^{22}$, $L^{31}$ and $L^{32}$, independently of one another, denote H or F, $L^{21}$ and/or $L^{31}$ preferably denote F, $X^2$ and $X^3$, independently of one another, denote halogen, halogenated alkyl or alkoxy having 1 to 3 C atoms or halogenated alkenyl or alkenyloxy having 2 or 3 C atoms, preferably F, Cl, —OCF$_3$ or —CF$_3$, very preferably F, Cl or —OCF$_3$, $Z^3$ denotes —CH$_2$CH$_2$—, —CF$_2$CF$_2$—, —COO—, trans-CH=CH—, trans-CF=CF—, —CH$_2$O— or a single bond, preferably —CH$_2$CH$_2$—, —COO—, trans-CH=CH— or a single bond and very preferably —COO—, trans-CH=CH— or a single bond, and l, m, n and o, independently of one another, denote 0 or 1, and optionally a dielectrically neutral component, component B, comprising one or more compounds of the formula IV

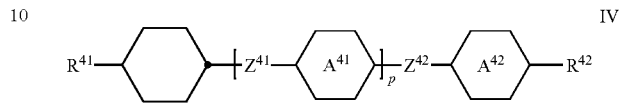
IV in which $R^{41}$ and $R^{42}$, independently of one another, have the meaning indicated above for $R^2$ under formula II, preferably $R^{41}$ denotes alkyl and $R^{42}$ denotes alkyl or alkoxy or $R^{41}$ denotes alkenyl and $R^{42}$ denotes alkyl,

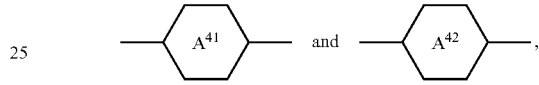

independently of one another and, in the case where

occurs twice, also these independently of one another, denote

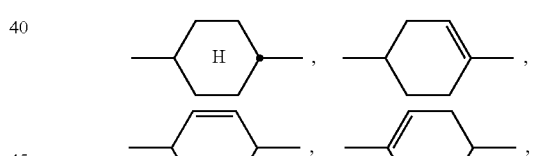

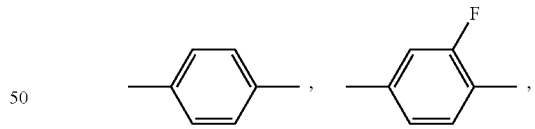

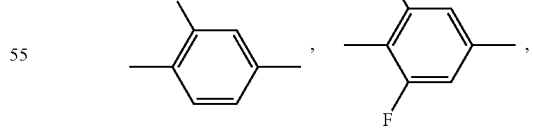

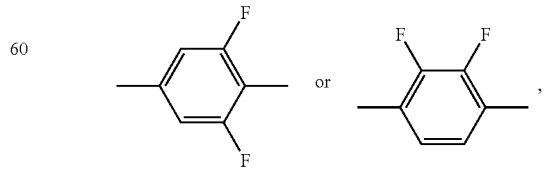

preferably one or more of

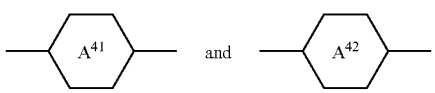

denote(s)

$Z^{41}$ and $Z^{42}$, independently of one another and, in the case where $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, preferably one or more of them denote(s) a single bond, and p denotes 0, 1 or 2, preferably 0 or 1.

Component A preferably comprises, more preferably predominantly consists of, even more preferably essentially consists of and very preferably entirely consists of one or more dielectrically positive compounds of the formula I having a dielectric anisotropy of greater than 3 in which the parameters have the respective meanings indicated above under formula I, and $X^1$ preferably denotes F.

In a preferred embodiment of the present invention, component A comprises one or more compounds selected from the group of the compounds of the formulae IA to IF, preferably selected from the group of the compounds of the formulae IA, IB, ID and IF:

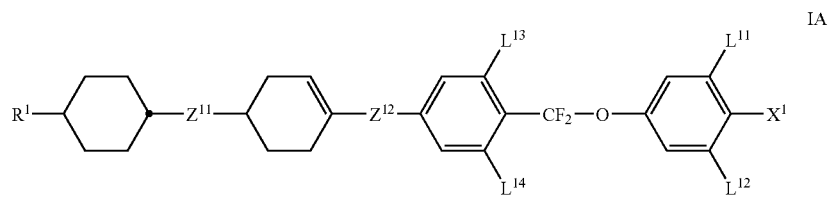

IA

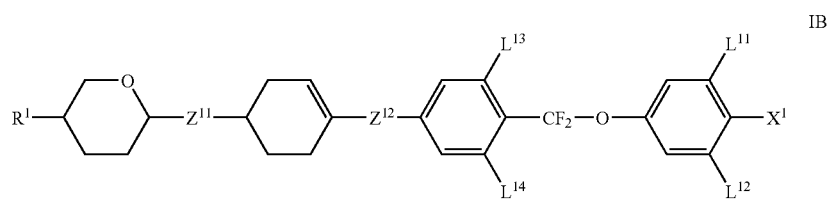

IB

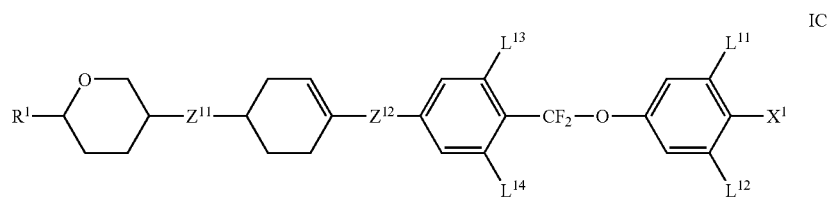

IC

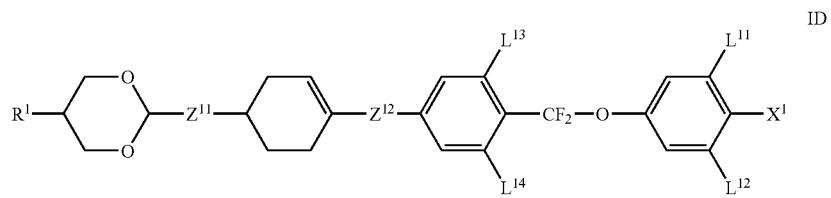

ID

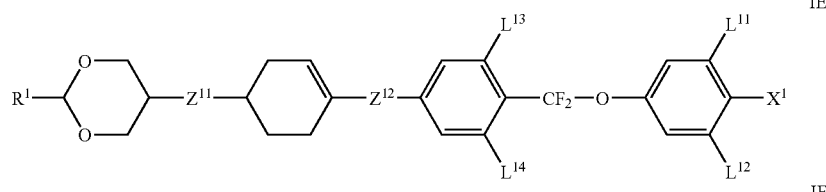

IE

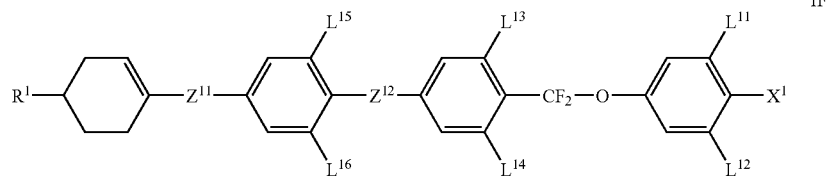

IF in which the parameters have the meanings given above under formula I, and $L^{15}$ and $L^{16}$, independently of one another and of $L^{11}$ to $L^{14}$, denote H, F or Cl, preferably H or F.

In a preferred embodiment of the present invention, component A comprises one or more compounds selected from the group of the compounds of the formulae IA-1 to IA-5, preferably selected from the group of the compounds of the formulae IA-2 to IA-5:

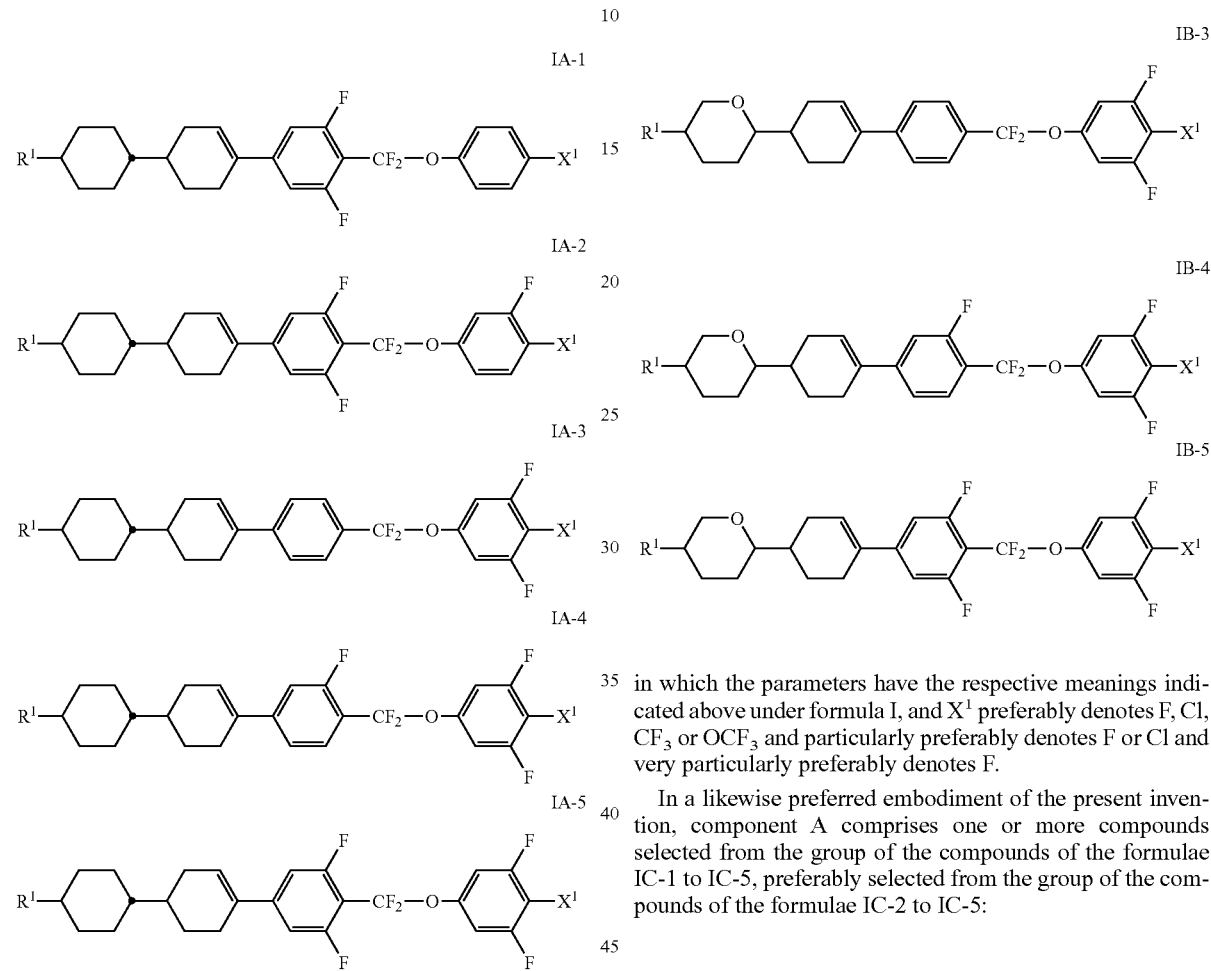

in which the parameters have the respective meanings indicated above under formula I, and $X^1$ preferably denotes F, Cl, $CF_3$ or $OCF_3$ and particularly preferably denotes F or Cl and very particularly preferably denotes F.

In a preferred embodiment of the present invention, component A comprises one or more compounds selected from the group of the compounds of the formulae IB-1 to IB-5, preferably selected from the group of the compounds of the formulae IB-2 to IB-5:

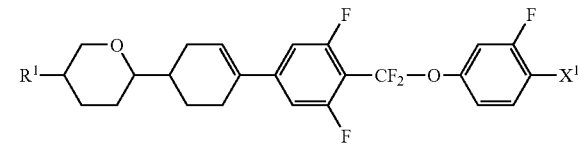

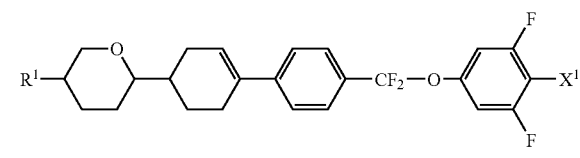

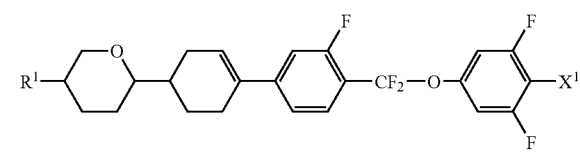

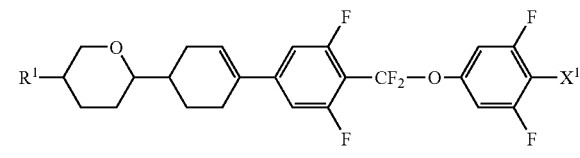

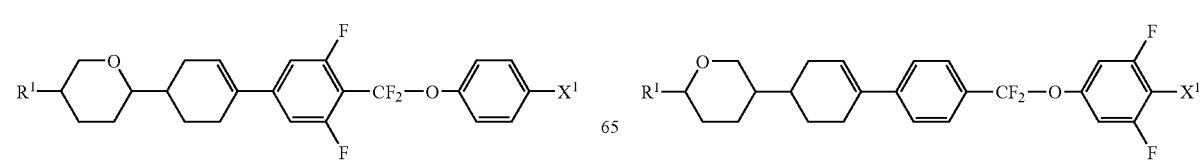

in which the parameters have the respective meanings indicated above under formula I, and $X^1$ preferably denotes F, Cl, $CF_3$ or $OCF_3$ and particularly preferably denotes F or Cl and very particularly preferably denotes F.

In a likewise preferred embodiment of the present invention, component A comprises one or more compounds selected from the group of the compounds of the formulae IC-1 to IC-5, preferably selected from the group of the compounds of the formulae IC-2 to IC-5:

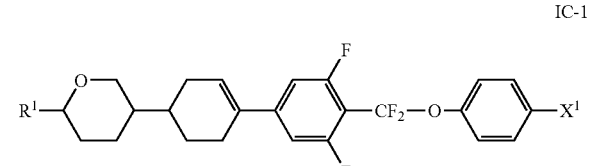

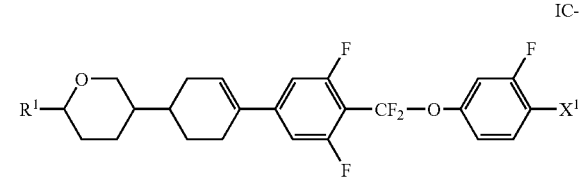

IC-4

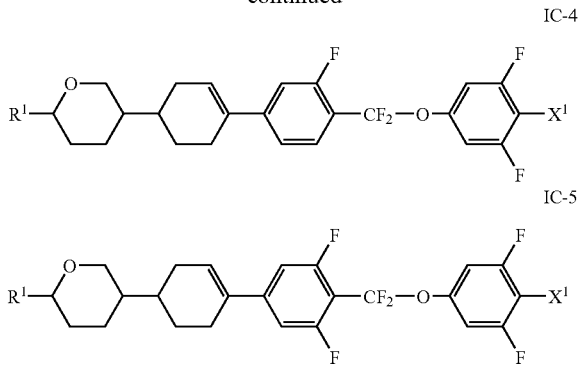

IC-5 in which the parameters have the respective meanings indicated above under formula I, and $X^1$ preferably denotes F, Cl, $CF_3$ or $OCF_3$ and particularly preferably denotes F or Cl and very particularly preferably denotes F.

In a further preferred embodiment of the present invention, component A comprises one or more compounds selected from the group of the compounds of the formulae ID-1 to ID-5, preferably selected from the group of the compounds of the formulae ID-1 to ID-5:

ID-1

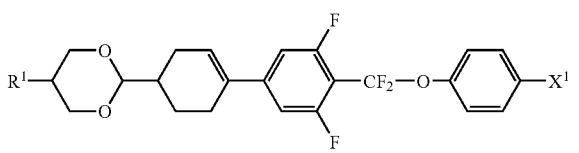

ID-2

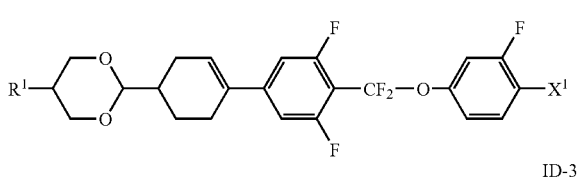

ID-3

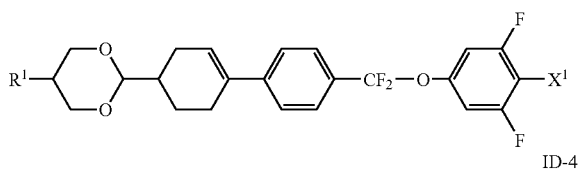

ID-4

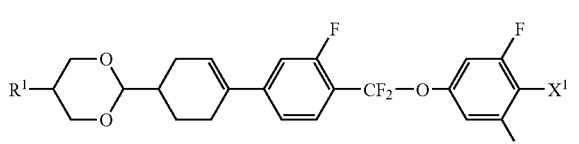

ID-5

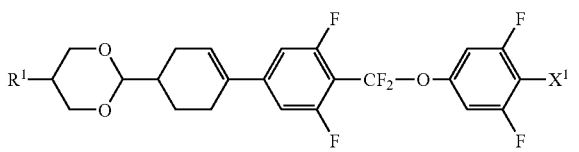

in which the parameters have the respective meanings indicated above under formula I, and $X^1$ preferably denotes F, Cl, $CF_3$ or $OCF_3$ and particularly preferably denotes F or Cl and very particularly preferably denotes F.

In a further preferred embodiment of the present invention, component A comprises one or more compounds selected from the group of the compounds of the formulae IE-1 to IE-5, preferably selected from the group of the compounds of the formulae IE-2 to IE-5:

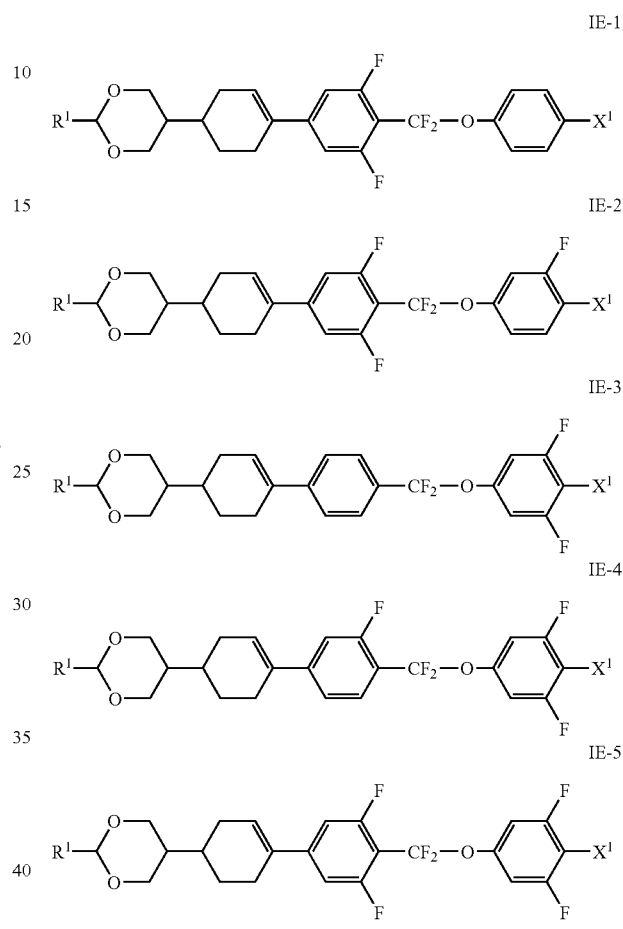

in which the parameters have the respective meanings indicated above under formula I, and $X^1$ preferably denotes F, Cl, $CF_3$ or $OCF_3$ and particularly preferably denotes F or Cl and very particularly preferably denotes F.

In a further preferred embodiment of the present invention, component A comprises one or more compounds selected from the group of the compounds of the formulae IF-1 to IF-5, preferably selected from the group of the compounds of the formulae IF-2 to IF-5:

IF-1

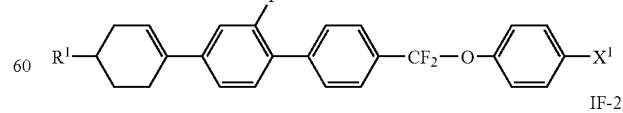

IF-2

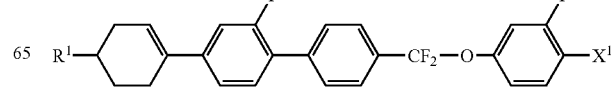

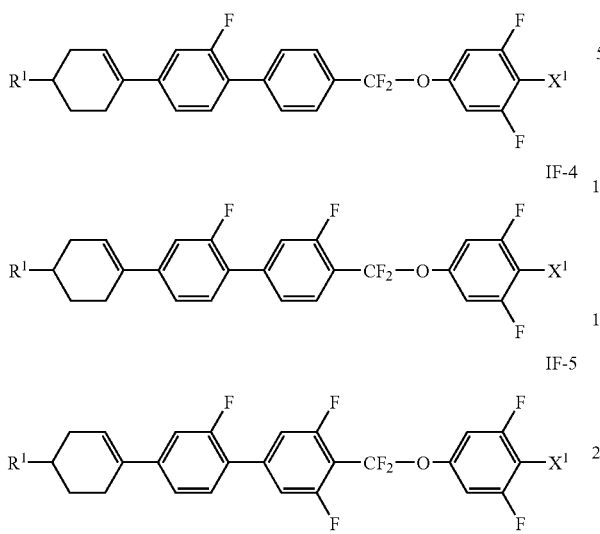

in which the parameters have the respective meanings indicated above under formula I, and $X^1$ preferably denotes F, Cl, $CF_3$ or $OCF_3$ and particularly preferably denotes F or Cl and very particularly preferably denotes F.

The total concentration of the compounds of the formula I in the medium is preferably in the range from 1% to 50%, more preferably from 2% to 40%, even more preferably from 3% to 35% and very preferably from 3%, preferably from 4%, to 30%. If a single homologous compound of the formula I is used in the medium, its concentration is preferably in the range from 1% to 20%, and if two or more homologous compounds of the formula I are used in the medium, 2% to 15% of the individual homologues are preferably used.

In addition to one or more compounds of the formula I, the media according to the present invention preferably comprise, in component A, one or more compounds selected from the group of the formulae II and III, more preferably predominantly consist of, even more preferably essentially consist of and very preferably entirely consist of compounds of the formulae I and II and/or III.

In a preferred embodiment of the present invention, component A comprises one or more compounds selected from the group of the compounds of the formulae II-1 to II-3:

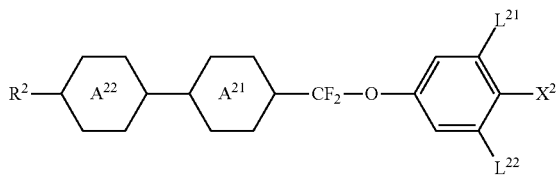

in which the parameters have the respective meanings indicated above under formula II, and in formula II-1 the parameters $L^{23}$ and $L^{24}$, independently of one another and of the other parameters, denote H or F, and in formula II-2

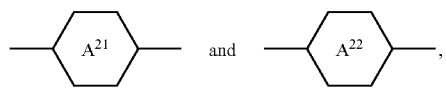

independently of one another, preferably denote

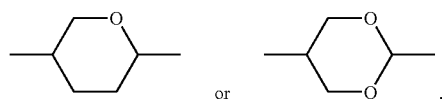

Component A preferably comprises compounds which are selected from the group of the compounds of the formulae II-1 to II-3 in which $L^{21}$ and $L^{22}$ or $L^{23}$ and $L^{24}$ both denote F.

In a preferred embodiment, component A comprises compounds which are selected from the group of the compounds of the formulae II-1 and II-2 in which $L^{21}$, $L^{22}$, $L^{23}$ and $L^{24}$ all denote F.

Component A preferably comprises one or more compounds of the formula II-1. The compounds of the formula II-1 are preferably selected from the group of the compounds of the formulae II-1a to II-1j:

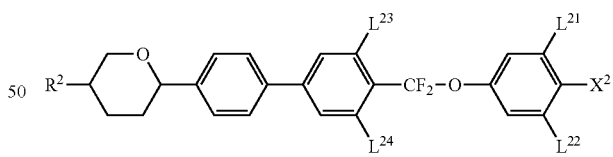

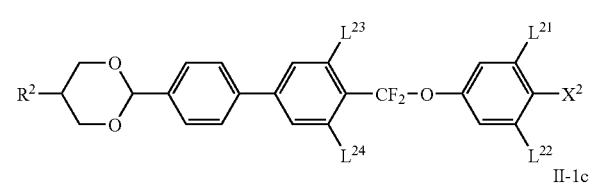

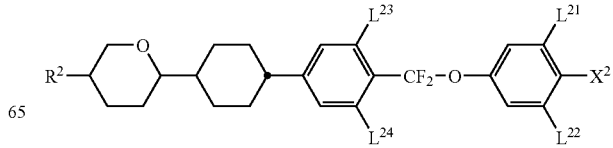

-continued

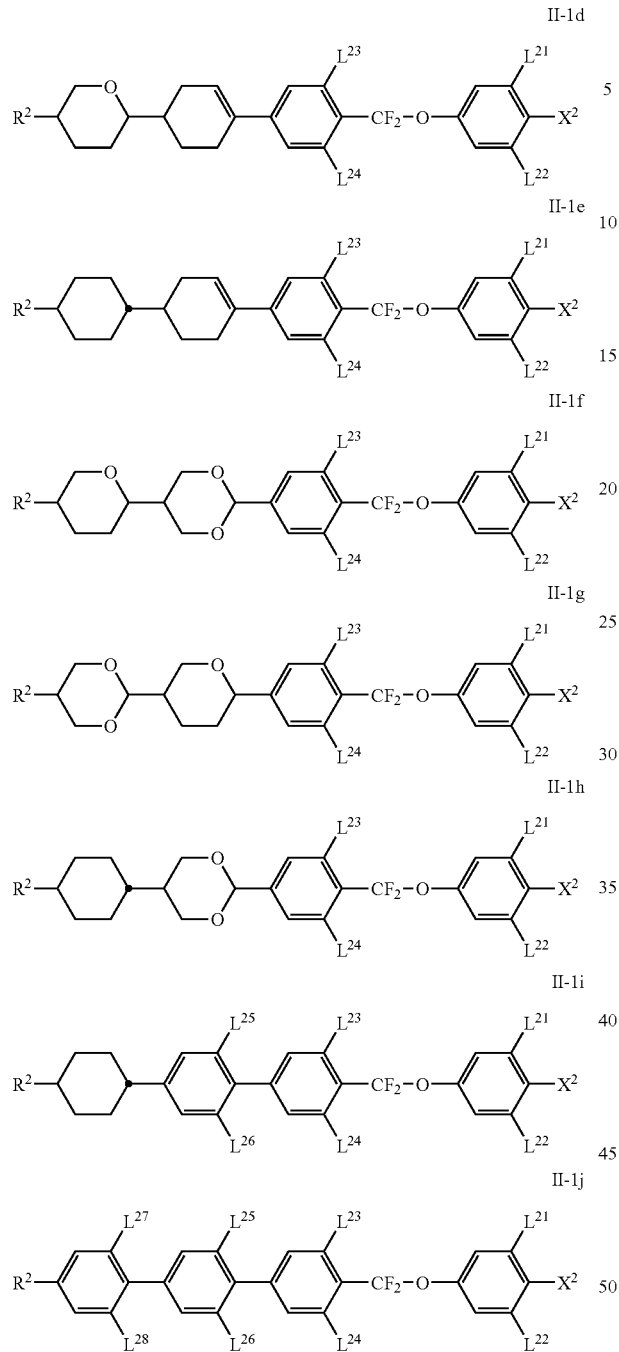

in which the parameters have the respective meanings indicated above, and $L^{25}$ to $L^{28}$, independently of one another, denote H or F, preferably $L^{27}$ and $L^{28}$ both denote H, particularly preferably $L^{26}$ denotes H.

Component A preferably comprises compounds which are selected from the group of the compounds of the formulae II-1a to II-1e in which $L^{21}$ and $L^{22}$ both denote F and/or $L^{23}$ and $L^{24}$ both denote F.

In a preferred embodiment, component A comprises compounds which are selected from the group of the compounds of the formulae II-1a to II-1h in which $L^{21}$, $L^{22}$, $L^{23}$ and $L^{24}$ all denote F.

Especially preferred compounds of the formula II-1 are

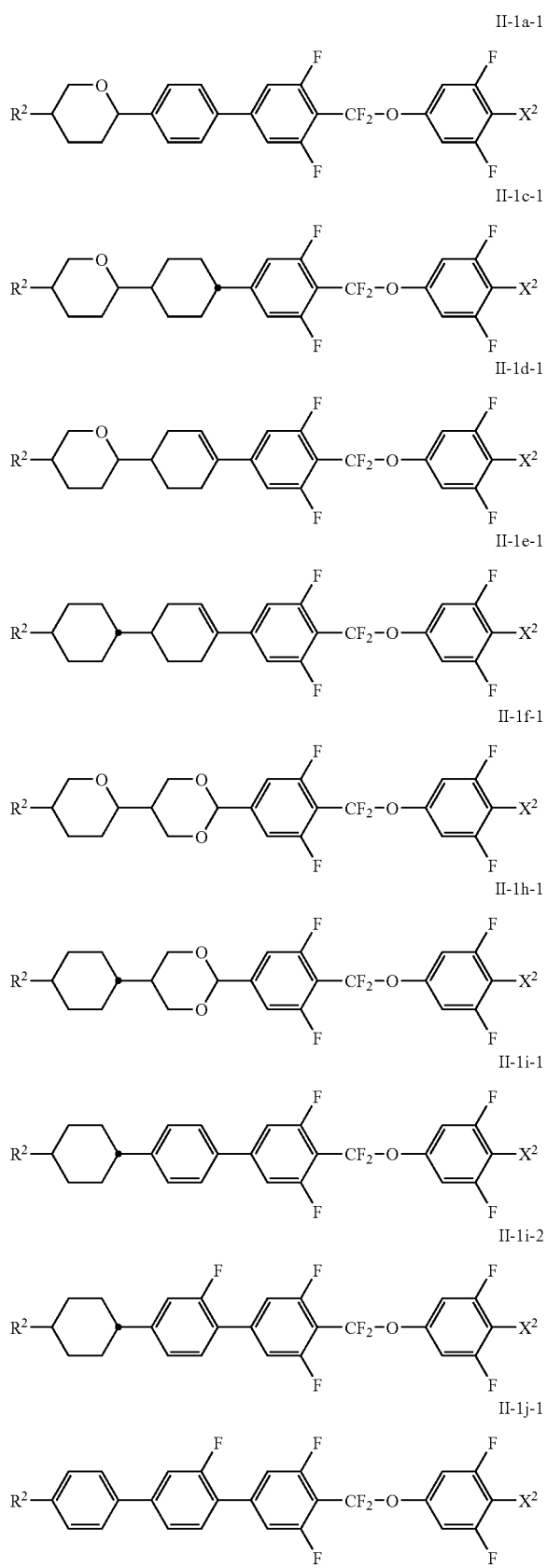

-continued

II-1j-2

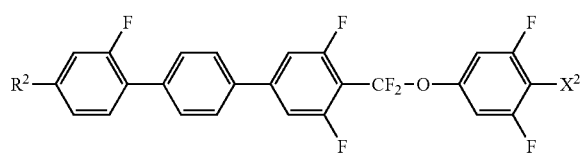

in which $R^2$ and $X^2$ have the meanings indicated above, and $X^2$ preferably denotes F.

Component A preferably comprises one or more compounds of the formula II-2. The compounds of the formula II-2 are preferably selected from the group of the compounds of the formulae II-2a to II-2c:

II-2a

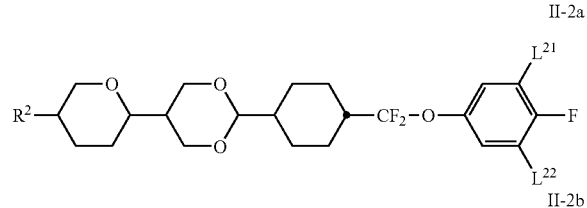

II-2b

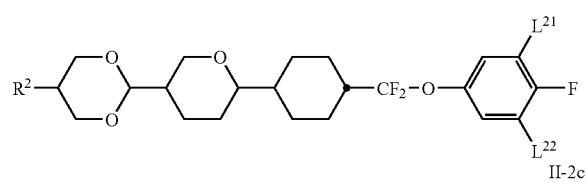

II-2c

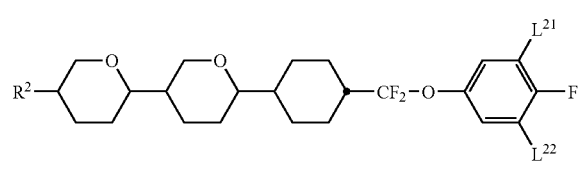

in which the parameters have the respective meanings indicated above, and $L^{21}$ and $L^{22}$ preferably both denote F.

Component A preferably comprises one or more compounds of the formula II-3. The compounds of the formula II-3 are preferably selected from the group of the compounds of the formulae II-3a to II-3e:

II-3a

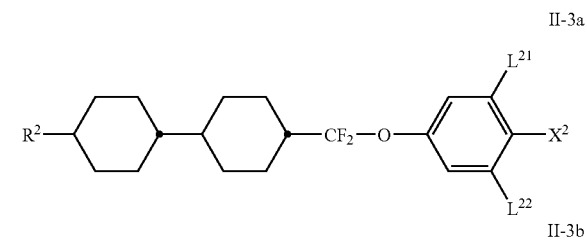

II-3b

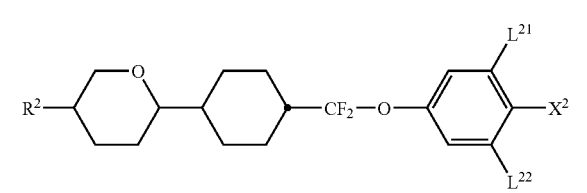

II-3c

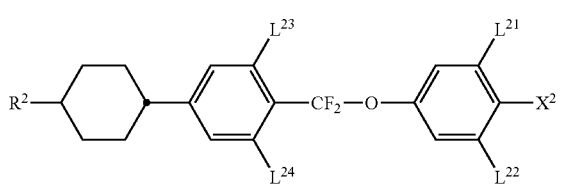

II-3d

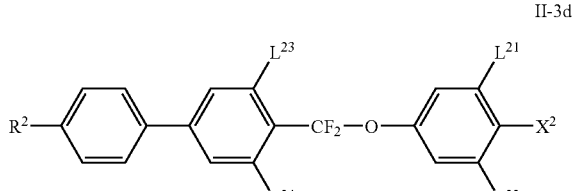

II-3e

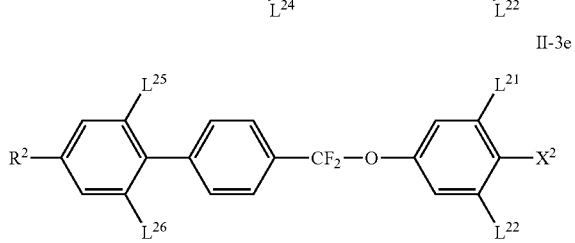

in which the parameters have the respective meanings indicated above, and $L^{25}$ and $L^{26}$, independently of one another and of the other parameters, denote H or F, and preferably in formulae II-3a and II-3b $L^{21}$ and $L^{22}$ both denote F, in formulae II-3c and II-3d $L^{21}$ and $L^{22}$ both denote F and/or $L^{23}$ and $L^{24}$ both denote F, and in formula II-3e $L^{21}$, $L^{22}$ and $L^{25}$ denote F.

Especially preferred compounds of the formula II-3 are

II-3a-1

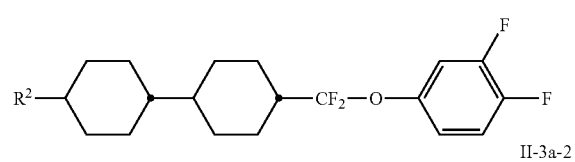

II-3a-2

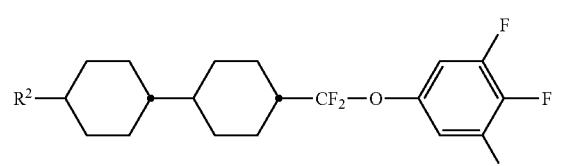

II-3b-1

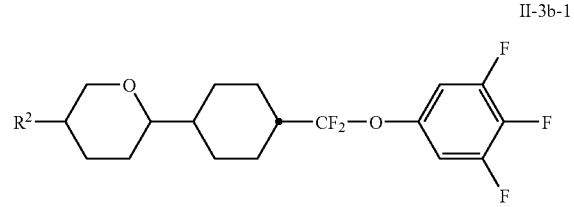

-continued

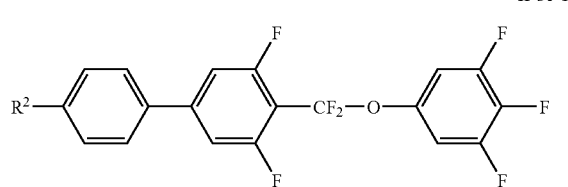
II-3c-1

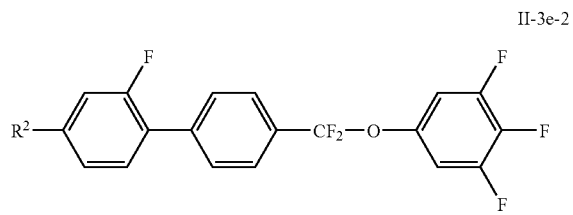
II-3e-2 in which $R^2$ has the meaning indicated above.

In a further preferred embodiment of the present invention, component A comprises one or more compounds selected from the group of the formulae III-1 and III-2:

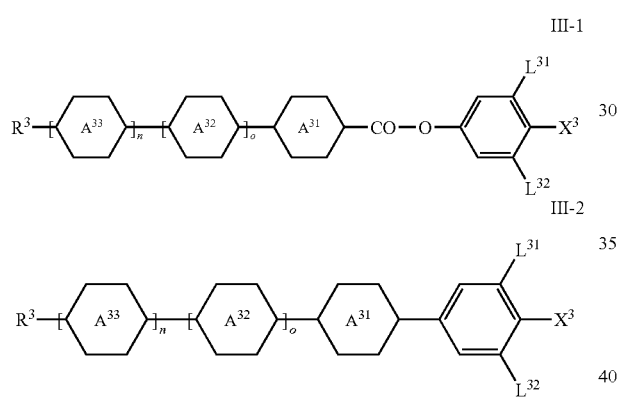
III-1

III-2 in which the parameters have the respective meanings indicated above under formula III.

Component A preferably comprises one or more compounds of the formula III-1. The compounds of the formula III-1 are preferably selected from the group of the compounds of the formulae III-1a and III-1b:

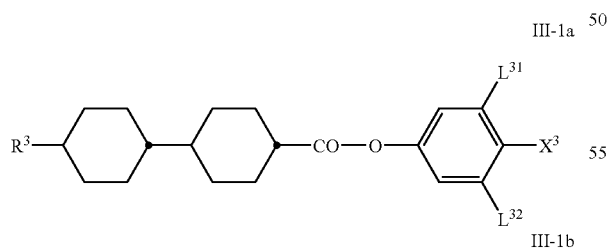
III-1a

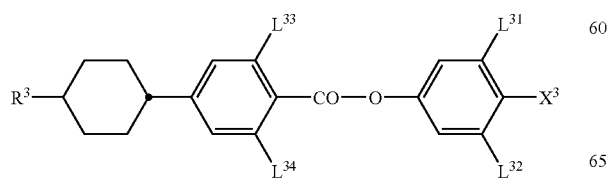
III-1b in which the parameters have the respective meanings indicated above, and the parameters $L^{33}$ and $L^{34}$, independently of one another and of the other parameters, denote H or F.

Component A preferably comprises one or more compounds of the formula III-2. The compounds of the formula III-2 are preferably selected from the group of the compounds of the formulae III-2a to III-2j:

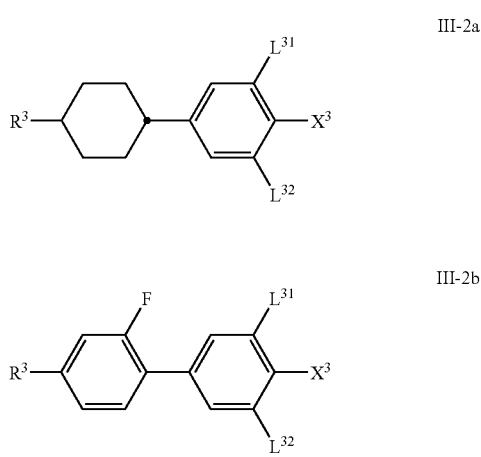
III-2a

III-2b

III-2c

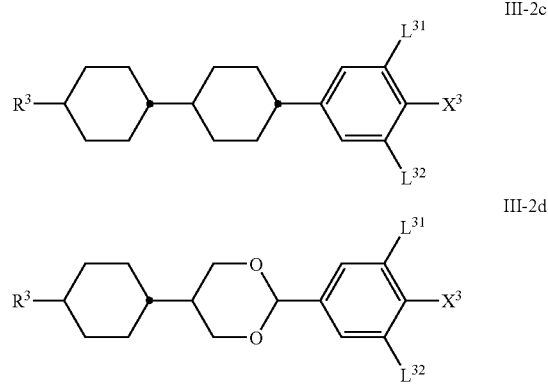
III-2d

III-2e

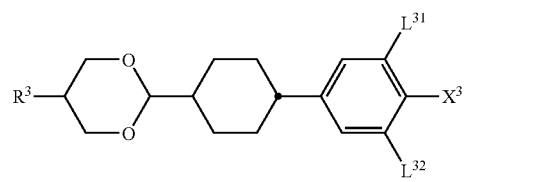
III-2f

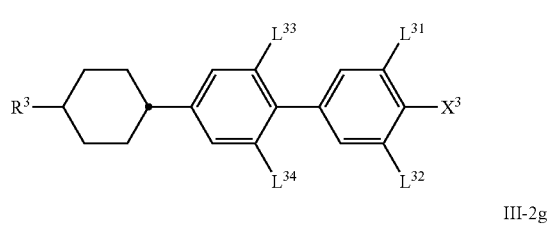
III-2g

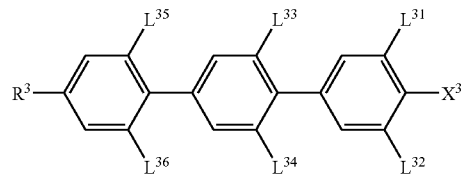

III-2h

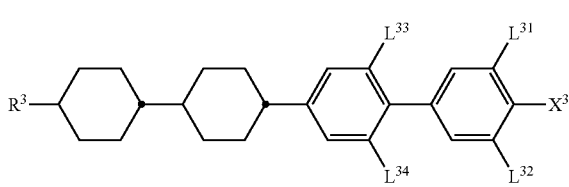

III-2i

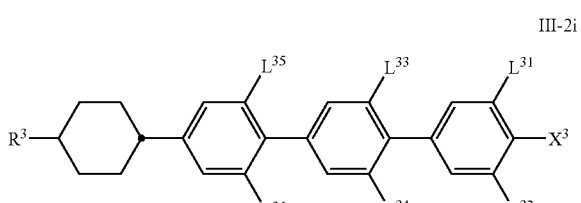

III-2j

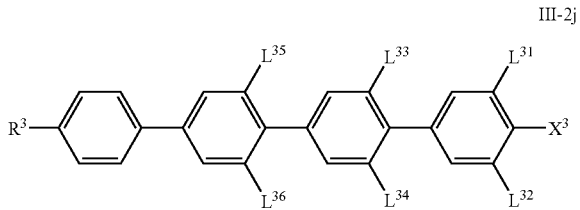

in which the parameters have the respective meanings indicated above, and the parameters $L^{35}$ and $L^{36}$, independently of one another and of the other parameters, denote H or F.

Component A preferably comprises one or more compounds of the formula III-1a, which are preferably selected from the group of the compounds of the formulae III-1a-1 to III-1a-6:

III-1a-1

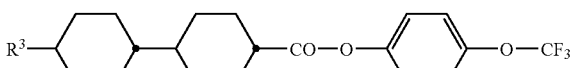

III-1a-2

III-1a-3

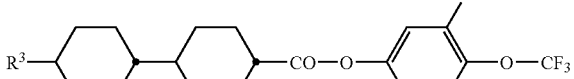

III-1a-4

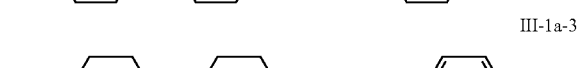

III-1a-5

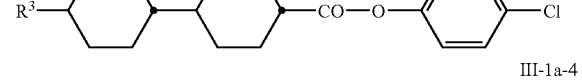

III-1a-6

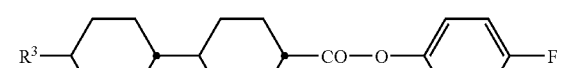

in which $R^3$ has the meaning indicated above.

Component A preferably comprises one or more compounds of the formula III-1b, which are preferably selected from the group of the compounds of the formulae III-1b-1 to III-1b-4, preferably III-1b-4:

III-1b-1

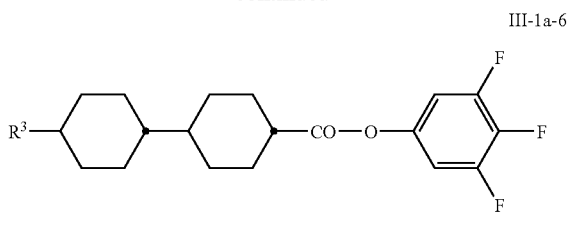

III-1b-2

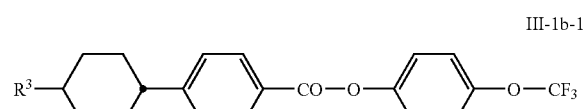

III-1b-3

III-1b-4

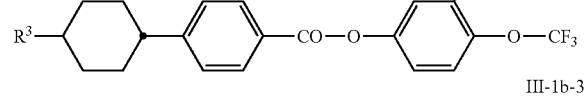

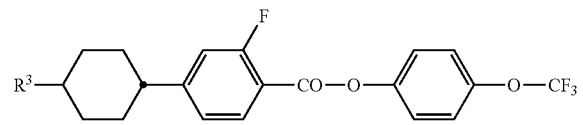

in which $R^3$ has the meaning indicated above.

Component A preferably comprises one or more compounds of the formula III-2a, which are preferably selected from the group of the compounds of the formulae III-2a-1 to III-2a-5:

III-2a-1

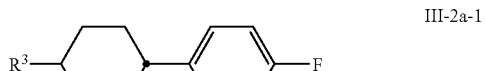

III-2a-2

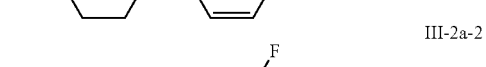

III-2a-3

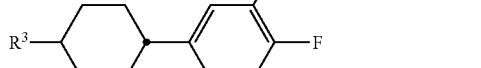

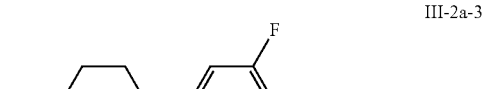

-continued

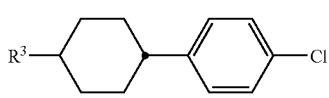
III-2a-4

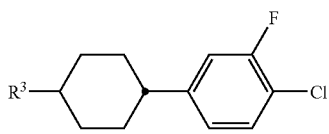
III-2a-5 in which R³ has the meaning indicated above.

Component A preferably comprises one or more compounds of the formula III-2b, which are preferably selected from the group of the compounds of the formulae III-2b-1 and III-2b-2, preferably III-2b-2:

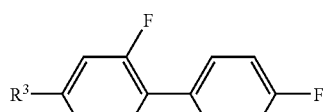
III-2b-1

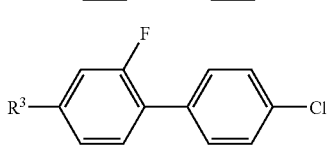
III-2b-2 in which R³ has the meaning indicated above.

Component A preferably comprises one or more compounds of the formula III-2c, which are preferably selected from the group of the compounds of the formulae III-2c-1 to III-2c-5:

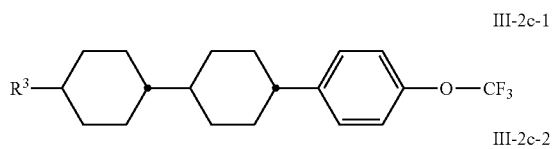
III-2c-1

III-2c-2

III-2c-3

III-2c-4

III-2c-5 in which R³ has the meaning indicated above.

Component A preferably comprises one or more compounds selected from the group of the compounds of the formulae III-2d and III-2e, which are preferably selected from the group of the compounds of the formulae III-2d-1 and III-2e-1:

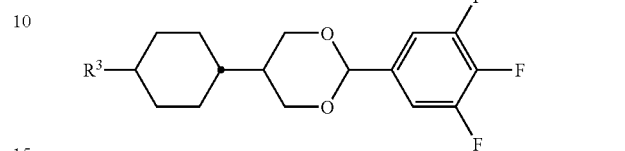
III-2d-1

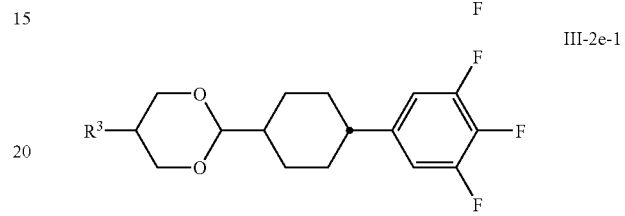
III-2e-1 in which R³ has the meaning indicated above.

Component A preferably comprises one or more compounds of the formula III-2f, which are preferably selected from the group of the compounds of the formulae III-2f-1 to III-2f-5:

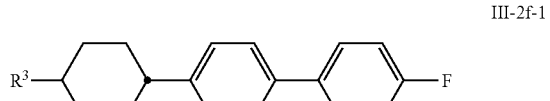
III-2f-1

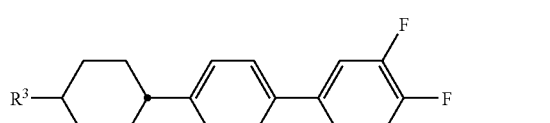
III-2f-2

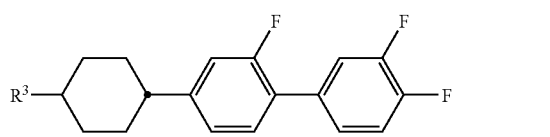
III-2f-3

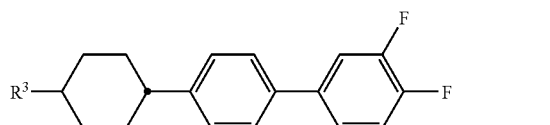
III-2f-4

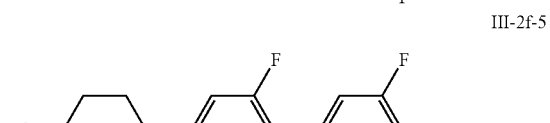
III-2f-5 in which R³ has the meaning indicated above.

Component A preferably comprises one or more compounds of the formula III-2g, which are preferably selected from the group of the compounds of the formulae III-2g-1 to III-2g-5:

III-2g-1
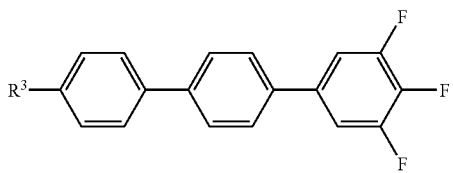

III-2g-2
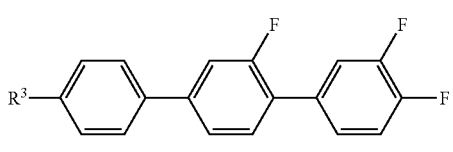

III-2g-3
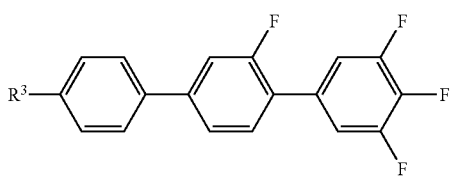

III-2g-4
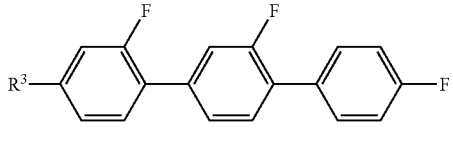

III-2g-5
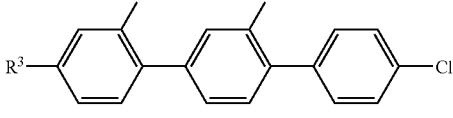

in which R³ has the meaning indicated above.

Component A preferably comprises one or more compounds of the formula III-2h, which are preferably selected from the group of the compounds of the formulae III-2h-1 to III-2h-5:

III-2h-1
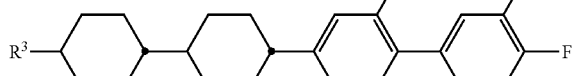

III-2h-2
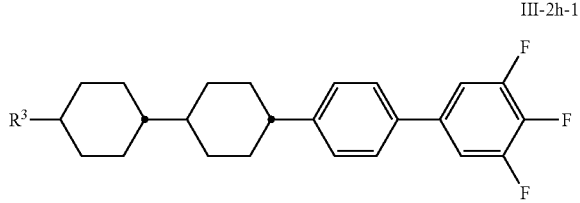

III-2h-3
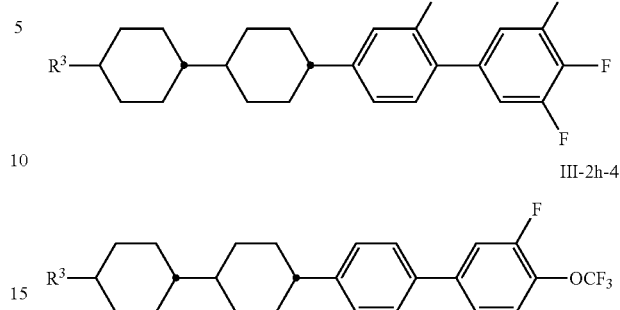

III-2h-4
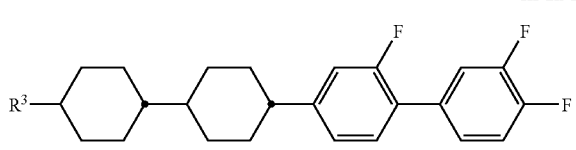

III-2h-5
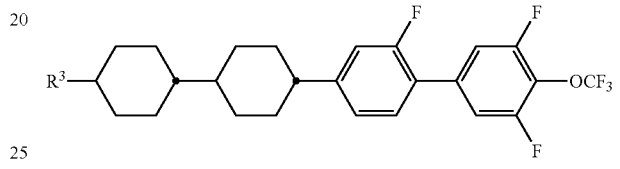

in which R³ has the meaning indicated above.

Component A preferably comprises one or more compounds of the formula which are preferably selected from the group of the compounds of the formulae III-2i-1 and III-2i-2:

III-2i-1
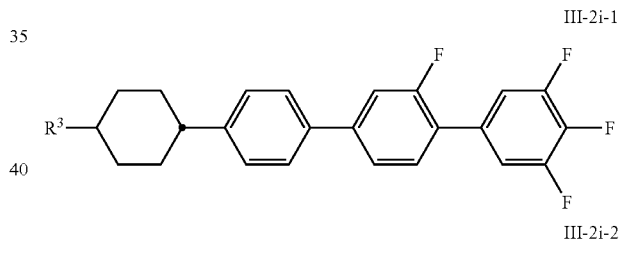

III-2i-2
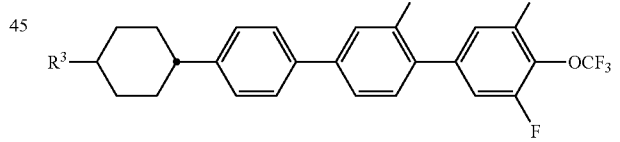

in which R³ has the meaning indicated above.

Component A preferably comprises one or more compounds of the formula III-2j, which are preferably selected from the group of the compounds of the formulae III-2j-1 and III-2j-2:

III-2j-1
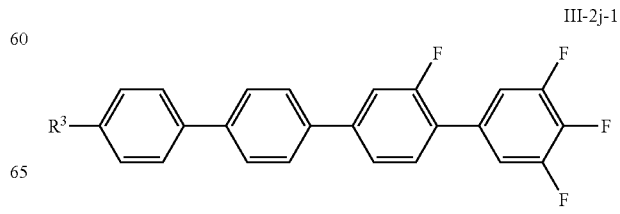

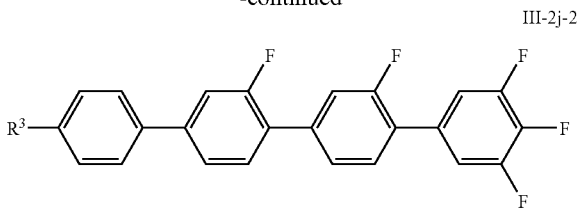

in which $R^3$ has the meaning indicated above.

Alternatively or in addition to the compounds of the formulae III-1 and/or III-2, the media according to the present invention may comprise one or more compounds of the formula III-3

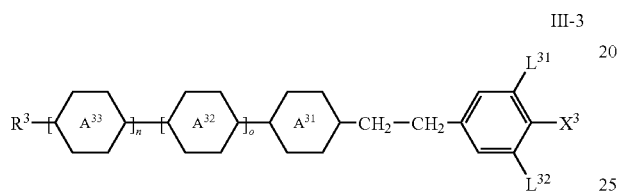

in which the parameters have the respective meanings indicated above under formula III and are preferably selected from the group of the formulae III-3a and III-3b:

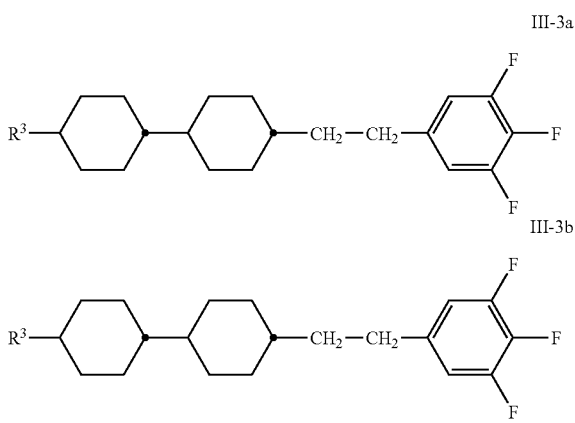

in which $R^3$ has the meaning indicated above.

The liquid-crystalline media according to the present invention preferably comprise a dielectrically neutral component, component B. This component preferably has a dielectric anisotropy in the range from −1.5 to 3. It preferably comprises, more preferably predominantly consists of, even more preferably essentially consists of and especially preferably entirely consists of dielectrically neutral compounds having a dielectric anisotropy in the range from −1.5 to 3. This component preferably comprises, more preferably predominantly consists of, even more preferably essentially consists of and very preferably entirely consists of one or more dielectrically neutral compounds having a dielectric anisotropy in the range from −1.5 to 3, of the formula IV.

The dielectrically neutral component, component B, preferably comprises one or more compounds selected from the group of the compounds of the formulae IV-1 to IV-6:

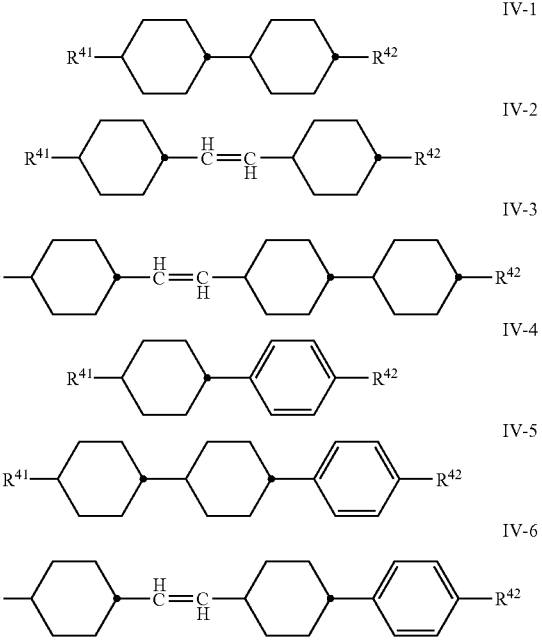

in which $R^{41}$ and $R^{42}$ have the respective meanings indicated above under formula IV, and in formulae IV-1, IV-5 and IV-6 $R^{41}$ preferably denotes alkyl or alkenyl, preferably alkenyl, and $R^{42}$ preferably denotes alkyl or alkenyl, preferably alkyl, in formula IV-2 $R^{41}$ and $R^{42}$ preferably denote alkyl, and in formula IV-4 $R^{41}$ preferably denotes alkyl or alkenyl, more preferably alkyl, and $R^{42}$ preferably denotes alkyl or alkoxy, more preferably alkoxy.

The dielectrically neutral component, component B, preferably comprises one or more compounds selected from the group of the compounds of the formulae IV-1, IV-4, IV-5 and IV-6, preferably one or more compounds of the formula IV-1 and one or more compounds selected from the group of the formulae IV-4 and IV-5, more preferably one or more compounds of each of the formulae IV-1, IV-4 and IV-5 and very preferably one or more compounds of each of the formulae IV-1, IV-4, IV-5 and IV-6.

In a preferred embodiment, component B comprises one or more compounds of the formula IV-5, more preferably selected from the respective sub-formulae thereof of the formulae CCP-V-n and/or CCP-nV-m and/or CCP-Vn-m, more preferably of the formulae CCP-V-n and/or CCP-V2-n and very preferably selected from the group of the formulae CCP-V-1 and CCP-V2-1. The definitions of these abbreviations (acronyms) are indicated below in Table D or are evident from Tables A to C.

In a likewise preferred embodiment, component B comprises one or more compounds of the formula IV-1, more preferably selected from the respective sub-formulae thereof of the formulae CC-n-m, CC-n-V and/or CC-n-Vm, more preferably of the formulae CC-n-V and/or CC-n-Vm and very preferably selected from the group of the formulae CC-3-V, CC-4-V, CC-5-V, CC-3-V1, CC-4-V1, CC-5-V1 and CC-3-V2. The definitions of these abbreviations (acronyms) are likewise indicated below in Table D or are evident from Tables A to C.

In a further preferred embodiment of the present invention, which may be the same as the previous one or a different one, the liquid-crystal mixtures according to the present invention comprise one or more compounds of the formula IV selected from the group of the compounds of the formulae IV-1 to IV-6 as shown above and optionally of the formulae IV-7 to IV-14:

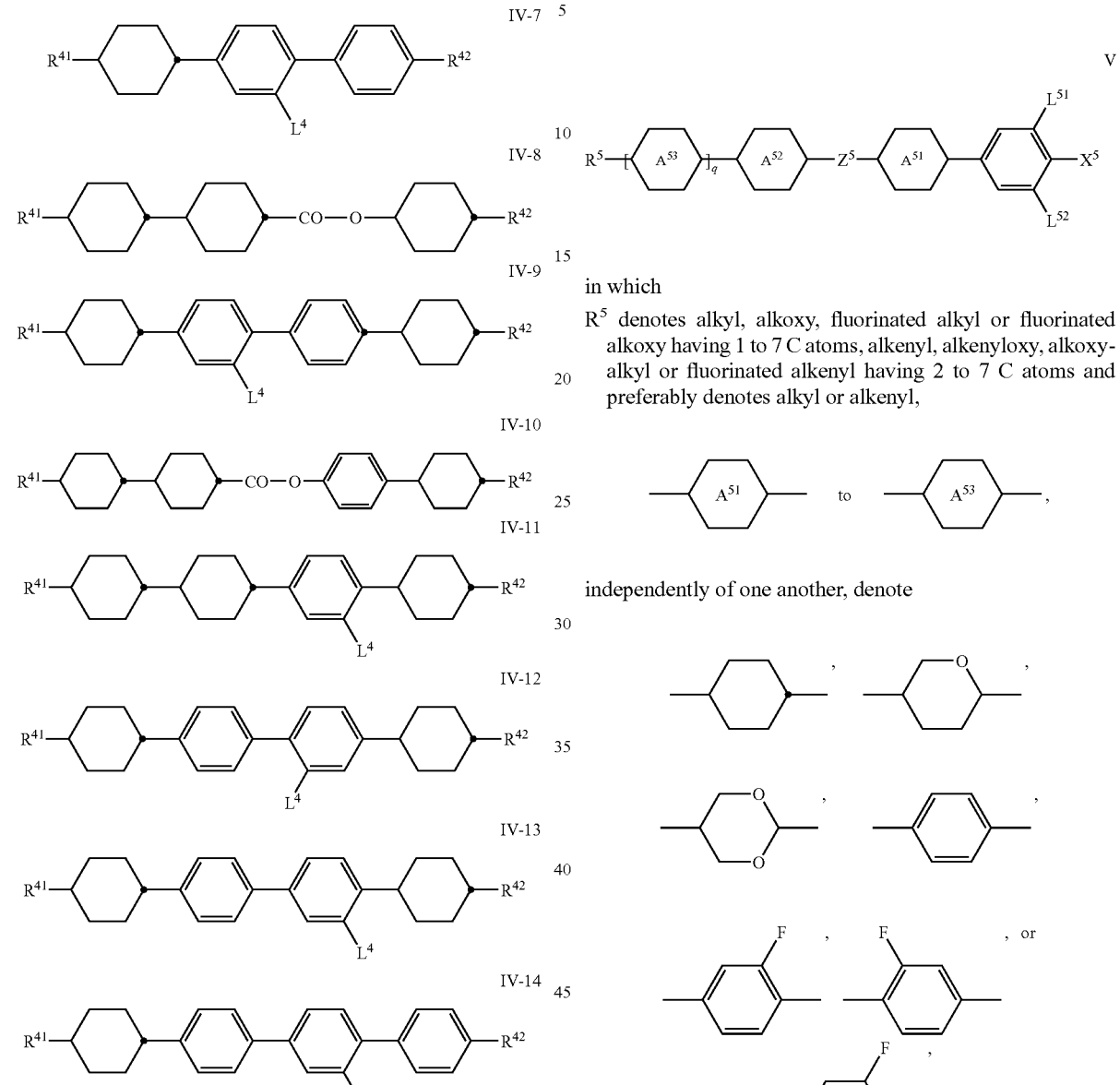

in which

R⁴¹ and R⁴², independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and L⁴ denotes H or F.

In a preferred embodiment, component B preferably comprises one or more compounds of the formula IV-7, more preferably selected from the respective sub-formulae thereof of the formulae CPP-3-2, CPP-5-2 and CGP-3-2, more preferably of the formulae CPP-3-2 and/or CGP-3-2 and very particularly preferably of the formula CPP-3-2. The definitions of these abbreviations (acronyms) are indicated below in Table D or are evident from Tables A to C.

Alternatively or in addition to the compounds of the formulae II and/or III, component A of the media according to the present invention may comprise one or more compounds of the formula V

in which

R⁵ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably denotes alkyl or alkenyl,

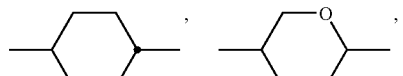

independently of one another, denote

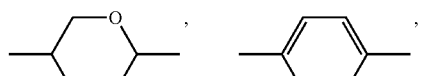

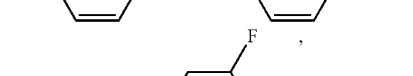

L⁵¹ and L⁵², independently of one another, denote H or F, L⁵¹ preferably denotes F, and X⁵ denotes halogen, halogenated alkyl or alkoxy having 1 to 3 C atoms or halogenated alkenyl or alkenyloxy having 2 or 3 C atoms, preferably F, Cl, —OCF₃ or —CF₃, very preferably F, Cl or —OCF₃, Z⁵ denotes —CH₂CH₂—, —CF₂CF₂—, —COO—, trans-CH=CH—, trans-CF=CF— or —CH₂O—, preferably —CH₂CH₂—, —COO— or trans-CH=CH— and very preferably —COO— or trans-CH=CH—, and q denotes 0 or 1.

In a preferred embodiment, the media according to the present invention comprise one or more compounds of the formula V, preferably selected from the group of the compounds of the formulae V-1 and V-2:

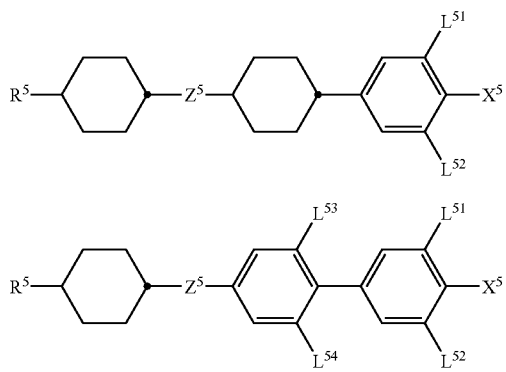

in which the parameters have the respective meanings indicated above, and the parameters $L^{53}$ and $L^{54}$, independently of one another and of the other parameters, denote H or F, and $Z^5$ preferably denotes —CH$_2$—CH$_2$—.

The compounds of the formula V-1 are preferably selected from the group of the compounds of the formulae V-1a and V-1b:

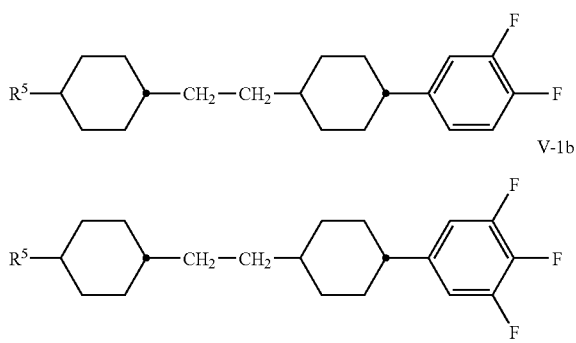

in which $R^5$ has the meaning indicated above.

The compounds of the formula V-2 are preferably selected from the group of the compounds of the formulae V-2a to V-2d:

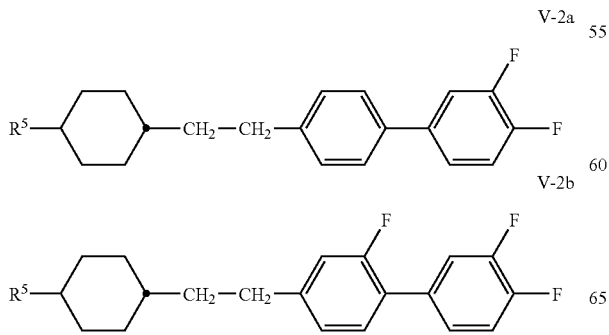

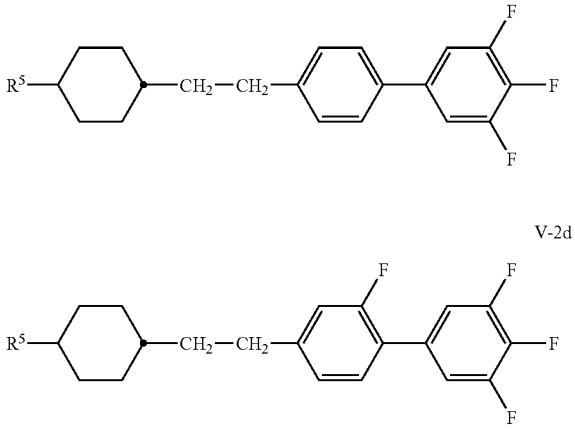

in which $R^5$ has the meaning indicated above.

The liquid-crystalline media according to the present invention preferably comprise, in component B, in addition to the compounds of the formula IV, one or more compounds of the formula VI

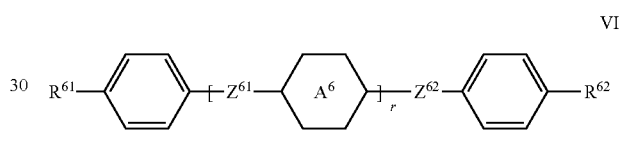

in which
$R^{61}$ and $R^{62}$ independently of one another, have the meaning indicated above for $R^2$ under formula II, preferably $R^{61}$ denotes alkyl and $R^{62}$ denotes alkyl or alkenyl,

and if it occurs twice, independently of one another on each occurrence, denotes

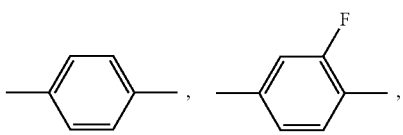

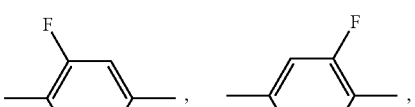

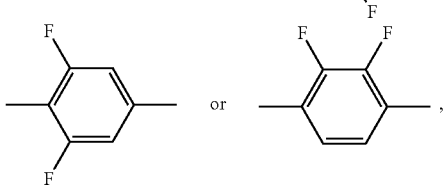

preferably one or more of

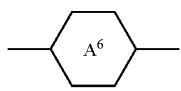

denote

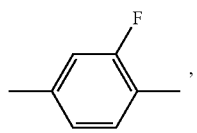, $Z^{61}$ and $Z^{62}$, independently of one another and, in the case where $Z^{61}$ occurs twice, also these independently of one another, denote —$CH_2CH_2$—, —COO—, trans-CH=CH—, trans-CF=CF—, —$CH_2O$—, —$CF_2O$— or a single bond, preferably one or more of them denote(s) a single bond, and r denotes 0, 1 or 2, preferably 0 or 1.

In this case, the dielectrically neutral component, component B, preferably comprises one or more compounds selected from the group of the compounds of the formulae VI-1 and VI-2:

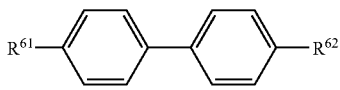 VI-1

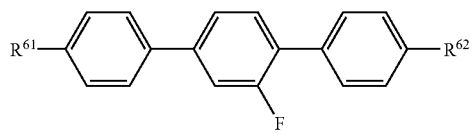 VI-2 in which $R^{61}$ and $R^{62}$ have the respective meanings indicated above under formula VI, and $R^{61}$ preferably denotes alkyl, and in formula VI-1 $R^{62}$ preferably denotes alkenyl, preferably —$(CH_2)_2$—CH=CH—$CH_3$, and in formula VI-2 $R^{62}$ preferably denotes alkyl.

In this case, the dielectrically neutral component, component B, preferably comprises one or more compounds selected from the group of the compounds of the formulae VI-1 and VI-2, in which $R^{61}$ preferably denotes n-alkyl, and in formula VI-1 $R^{62}$ preferably denotes alkenyl, and in formula VI-2 $R^{62}$ preferably denotes n-alkyl.

In a preferred embodiment, component B comprises one or more compounds of the formula VI-1, more preferably of the sub-formula PP-n-2Vm thereof, even more preferably of the formula PP-1-2V1. The definitions of these abbreviations (acronyms) are indicated below in Table D or are evident from Tables A to C.

In a further preferred embodiment, component B comprises one or more compounds of the formula VI-2, more preferably of the sub-formula PGP-n-m thereof, even more preferably of the sub-formula PGP-3-m thereof, very preferably selected from the formulae PGP-3-2, PGP-3-3, PGP-3-4 and PGP-3-5. The definitions of these abbreviations (acronyms) are likewise indicated below in Table D or are evident from Tables A to C.

Besides the compounds of the formula I and the compounds of the formulae II and/or III, the liquid-crystal mixtures according to the present invention preferably comprise at least compounds of a further formula. These further compounds are preferably compounds selected from the group of the compounds of the formulae IV and/or V and/or VI, preferably of the formula IV.

The mixtures according to the present invention may of course also comprise one or more compounds of each of the formulae I, VI and VIII, preferably of the formulae I to VI, particularly preferably of the formulae I to V.

In addition, the liquid-crystal mixtures according to the present invention may optionally comprise a further component, component C, which has negative dielectric anisotropy and comprises, preferably predominantly consists of, more preferably essentially consists of and very preferably entirely consists of dielectrically negative compounds, preferably of the formula VII

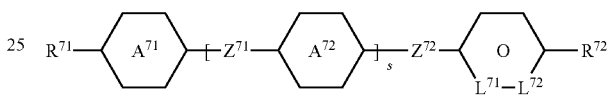 VII in which $R^{71}$ and $R^{72}$, independently of one another, have the meaning indicated above for $R^2$ under formula II,

denotes

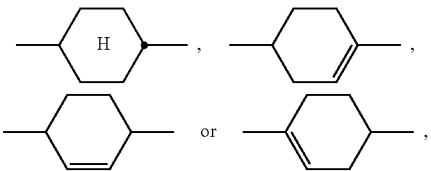

preferably

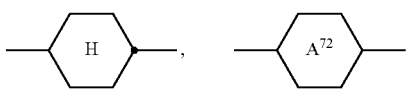

denotes

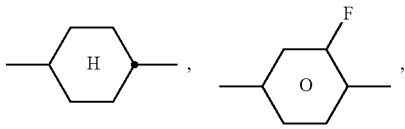

-continued

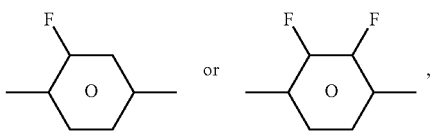

$Z^{71}$ and $Z^{72}$, independently of one another, denote —CH$_2$CH$_2$—, —COO—, trans-CH=CH—, trans-CF=CF—, —CH$_2$O—, —CF$_2$O— or a single bond, preferably one or more of them denote(s) a single bond and very preferably both denote a single bond, $L^{71}$ and $L^{72}$, independently of one another, denote C—F or N, preferably one or more of them denote(s) C—F and very preferably both denote C—F, and s denotes 0 or 1.

In addition, the liquid-crystal mixtures according to the present invention may comprise a further optional component, component D, which has positive dielectric anisotropy and comprises, preferably predominantly consists of, more preferably essentially consists of and very preferably entirely consists of dielectrically positive compounds, preferably of the formula VIII

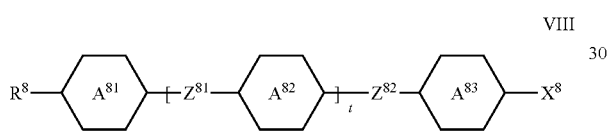

in which

R$^8$ has the meaning indicated above for R$^2$ under formula II, one of

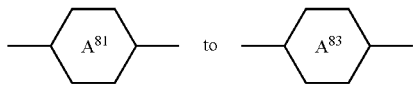

which is present denotes

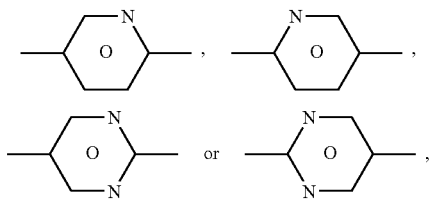

preferably

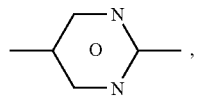

and the others have the same meaning or, independently of one another, denote

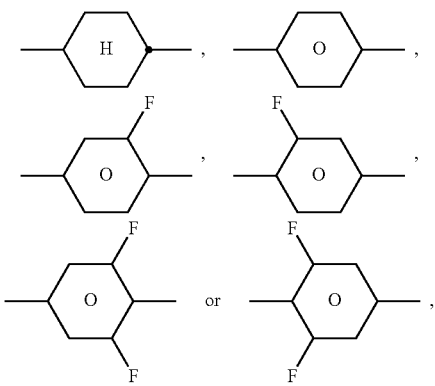

preferably

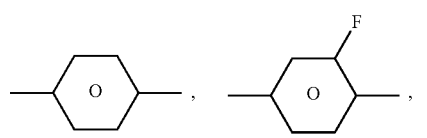

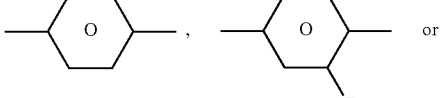

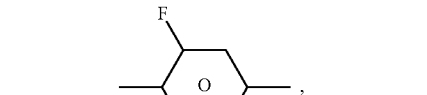

$Z^{81}$ and $Z^{82}$, independently of one another, denote —CH$_2$CH$_2$—, —COO—, trans-CH=CH—, trans-CF=CF—, —CH$_2$O—, —CF$_2$O— or a single bond, preferably one or more of them denote(s) a single bond and very preferably both denote a single bond, t denotes 0, 1 or 2, preferably 0 or 1, more preferably 1, and X$^8$ has the meaning indicated above for X$^2$ under formula II or alternatively, independently of R$^8$, may have the meaning indicated for R$^8$, and from which the compounds of the formula I are excluded.

The liquid-crystalline media according to the present invention preferably comprise, more preferably predominantly consist of, even more preferably essentially consist of and very preferably entirely consist of components A to E, preferably A to D and very preferably A to C, and in particular compounds selected from the group of the compounds of the formulae I to VIII, preferably I to V and very preferably I to III and/or IV.

In this application, comprise in connection with compositions means that the relevant entity, i.e. the medium or the component, comprises the component or components or the compound or compounds indicated, preferably in a total concentration of 10% or more and very preferably 20% or more.

In this connection, predominantly consist of means that the relevant entity comprises 55% or more, preferably 60% or more and very preferably 70% or more of the component or components or the compound or compounds indicated.

In this connection, essentially consist of means that the relevant entity comprises 80% or more, preferably 90% or more and very preferably 95% or more of the component or components or the compound or compounds indicated.

In this connection, entirely consist of means that the relevant entity comprises 98% or more, preferably 99% or more and very preferably 100.0% of the component or components or the compound or compounds indicated.

Component C preferably comprises, more preferably predominantly consists of and very preferably entirely consists of one or more compounds of the formula VII, preferably selected from the group of the compounds of the formulae VII-1 to VII-3:

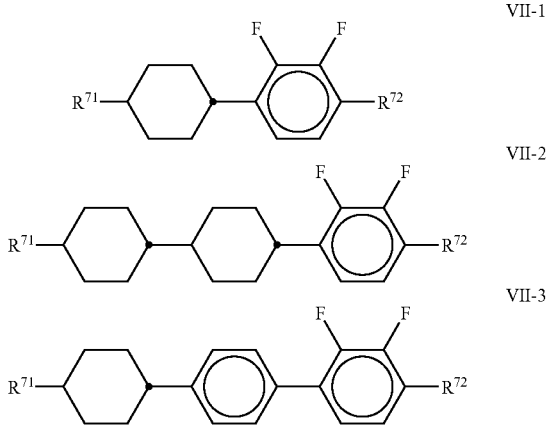

in which
$R^{71}$ and $R^{72}$ have the respective meanings indicated above under formula VII.

In formulae VII-1 to VII-3, $R^{71}$ preferably denotes n-alkyl or 1E-alkenyl and $R^{72}$ preferably denotes n-alkyl or alkoxy.

Other mesogenic compounds which are not explicitly mentioned above can optionally and advantageously also be used in the media according to the present invention. Such compounds are known to the person skilled in the art.

The liquid-crystal media according to the present invention preferably have a clearing point of 60° C. or more, more preferably 65° C. or more, particularly preferably 70° C. or more and very particularly preferably 75° C. or more.

The Δn of the liquid-crystal media according to the present invention, at 589 nm ($Na^D$) and 20° C., is preferably in the range from 0.060 or more to. 0.140 or less, more preferably in the range from 0.070 or more to 0.130 or less, even more preferably in the range from 0.080 or more to 0.125 or less and very preferably in the range from 0.090 or more to 0.122 or less.

In a preferred embodiment of the present application, the Δn of the liquid-crystal media according to the present invention is preferably 0.080 or more, more preferably 0.090 or more.

The Δ∈ of the liquid-crystal medium according to the invention, at 1 kHz and 20° C., is preferably 2 or more, more preferably 4 or more and very preferably 6 or more. In particular, Δ∈ is 15 or less.

The nematic phase of the media according to the invention preferably extends at least from 0° C. or less to 70° C. or more, more preferably at least from −20° C. or less to 70° C. or more, very preferably at least from −30° C. or less to 75° C. or more and in particular at least from −40° C. or less to 75° C. or more.

In a first preferred embodiment of the present invention, the Δn of the liquid-crystal media is in the range from 0.090 or more to 0.130 or less, more preferably in the range from 0.095 or more to 0.120 or less and very preferably in the range from 0.100 or more to 0.115 or less, while Δ∈ is preferably in the range from 2 or more to 12 or less, preferably 10 or less.

In a second preferred embodiment of the present invention, the Δn of the liquid-crystal media is in the range from 0.085 or more to 0.130 or less, more preferably in the range from 0.090 or more to 0.125 or less and very preferably in the range from 0.095 or more to 0.120 or less, while Δ∈ is preferably 4 or more, more preferably 6 or more, even more preferably 8.0 or more and very preferably in the range from 8.0 or more to 10.0 or less.

In this embodiment, the nematic phase of the media according to the invention preferably extends at least from −20° C. or less to 70° C. or more, more preferably at least from −20° C. or less to 70° C. or more, very preferably at least from −30° C. or less to 70° C. or more and in particular at least from −40° C. or less to 70° C. or more.

In a third preferred embodiment of the present invention, the Δn of the liquid-crystal media is in the range from 0.070 or more to 0.120 or less, more preferably in the range from 0.075 or more to 0.115 or less and very preferably in the range from 0.080 or more to 0.110 or less, while Δ∈ is preferably 2.0 or more, more preferably in the range from 3.0 or more to 14.0 or less and very preferably either in the range from 4.0 or more to 6.0 or less or particularly preferably in the range from 6.0 or more to 11.0 or less.

In this embodiment, the nematic phase of the media according to the invention preferably extends at least from −20° C. or less to 75° C. or more, more preferably at least from −30° C. or less to 70° C. or more, very preferably at least from −30° C. or less to 75° C. or more and in particular at least from −30° C. or less to 80° C. or more.

In a fourth preferred embodiment of the present invention, the Δn of the liquid-crystal media is in the range from 0.080 or more to 0.120 or less, more preferably in the range from 0.085 or more to 0.115 or less and very preferably in the range from 0.090 or more to 0.110 or less, while Δ∈ is preferably 1.5 or more, more preferably in the range from 2.0 or more to 8.0 or less and very preferably either in the range from 2.0 or more to 6.0 or less or particularly preferably in the range from 2.0 or more to 4.0 or less.

In this embodiment, the nematic phase of the media according to the invention preferably extends at least from −20° C. or less to 65° C. or more, more preferably at least from −30° C. or less to 70° C. or more, very preferably at least from −30° C. or less to 75° C. or more and in particular at least from −30° C. or less to 80° C. or more.

In a fifth preferred embodiment of the present invention, the Δn of the liquid-crystal media is in the range from 0.070 or more to 0.120 or less, more preferably in the range from 0.070 or more to 0.110 or less and very preferably in the range from 0.090 or more to 0.100 or less, while Δε is preferably 2.0 or more, more preferably in the range, from 3.0 or more to 8.0 or less and very preferably in the range from 3.0 or more to 4.0 or less.

In this embodiment, the nematic phase of the media according to the invention preferably extends at least from −20° C. or less to 65° C. or more, more preferably at least from −30° C. or less to 70° C. or more, very preferably at least from −30° C. or less to 70° C. or more and in particular at least from −40° C. or less to 70° C. or more.

In a sixth preferred embodiment of the present invention, the Δn of the liquid-crystal media is in the range from 0.110 or more to 0.150 or less, more preferably in the range from 0.120 or more to 0.145 or less and very preferably from about 0.137 or more to 0.100 or less, preferably in the range from 2.0 or more to 8.0 or less and very preferably in the range from 3.0 or more to 7.0 or less.

In this embodiment, the nematic phase of the media according to the invention preferably extends at least from −20° C. or less to 70° C. or more, more preferably at least from −30° C. or less to 70° C. or more, very preferably at least from −30° C. or less to 75° C. or more and in particular at least from −30° C. or less to 80° C. or more.

In accordance with the present invention, the compounds of the formula I are preferably used in a total concentration of 1% to 50%, more preferably of 1% to 30%, even more preferably 2% to 30% and very preferably 3% to 30% of the mixture as a whole.

The compounds of the formulae II and III are preferably used in a total concentration of 2% to 60%, more preferably 3% to 55%, even more preferably 15% to 50% and very preferably 20% to 45% of the mixture as a whole.

The compounds of the formula IV are preferably used in a total concentration of 0% to 70%, more preferably 10% to 65%, even more preferably 20% to 60% and very preferably 15% to 55% of the mixture as a whole.

The compounds of the formula VI are preferably used in a total concentration of 0% to 50%; more preferably 1% to 40%, even more preferably 5% to 30% and very preferably 10% to 20% of the mixture as a whole.

Component C is preferably used in a concentration of 0% to 30%, more preferably 0% to 15% and very preferably 1% to 10% of the mixture as a whole.

The media according to the invention may optionally comprise further liquid-crystal compounds in order to adjust the physical properties. Such compounds are known to the person skilled in the art. Their concentration in the media according to the present invention is preferably 0% to 30%, more preferably 0.1% to 20% and very preferably 1% to 15%.

In the first preferred embodiment of the present invention mentioned above, the compounds of the formula I are preferably used in a total concentration of 1% to 65%, more preferably 3% to 60% and very preferably 5% to 57% of the mixture as a whole, while the compounds of the formula VI are preferably used in a total concentration of 5% to 40%, more preferably 10% to 35% and very preferably 10% to 30% of the mixture as a whole.

In this preferred embodiment, the media preferably comprise one or more compounds of the formula VI and very preferably of the formula VI-2.

Especially in the second preferred embodiment of the present invention mentioned above, the medium preferably comprises one or more compounds of the formula IV, more preferably of the formula IV-1, even more preferably selected from the respective sub-formulae thereof of the formulae CC-n-V and/or CC-n-Vm, more preferably of the formulae CC-n-V1 and/or CC-n-V and very preferably selected from the group of the formulae CC-3-V, CC-4-V, CC-5-V and CC-3-V1. The definitions of these abbreviations (acronyms) are indicated below in Table D.

In a preferred embodiment, the concentration of the compound of the formula CC-3-V in the media according to the invention is 50% to 65%, particularly preferably 55% to 60%.

The liquid-crystal media preferably comprise in total 50% to 100%, more preferably 70% to 100% and very preferably 80% to 100% and in particular 90% to 100% of one or more compounds selected from the group of the compounds of the formulae I, II, III, IV, V, VI and VII, preferably of the formulae I, II, III, IV, V and VI.

In the present application, the expression dielectrically positive describes compounds or components where $\Delta\varepsilon > 3.0$, dielectrically neutral describes those where $-1.5 \leq \Delta\varepsilon \leq 3.0$ and dielectrically negative describes those where $\Delta\varepsilon \leq -1.5$. $\Delta\varepsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$\Delta\varepsilon$ is defined as $(\varepsilon_\| - \varepsilon_\perp)$, while $\varepsilon_{av.}$ is $(\varepsilon_\| + 2\varepsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The dielectric permittivities of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The ranges of the parameters indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are indicated in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany and are quoted for a temperature of 20° C., unless expressly stated otherwise. The optical anisotropy (Δn) is determined at a wavelength of 589.3 nm. The dielectric anisotropy (Δ∈) is determined at a frequency of 1 kHz. The threshold voltages, as well as all other electro-optical properties, are determined using test cells produced at Merck KGaA, Germany. The test cells for the determination of Δ∈ have a cell thickness of approximately 20 µm. The electrode is a circular ITO electrode having an area of 1.13 cm² and a guard ring. The orientation layers are SE-1211 from Nissan Chemicals, Japan, for homeotropic orientation (∈$_∥$) and polyimide AL-1054 from Japan Synthetic Rubber, Japan, for homogeneous orientation (∈$_⊥$). The capacitances are determined using a Solatron 1260 frequency response analyser using a sine wave with a voltage of 0.3 V$_{rms}$. The light used in the electro-optical measurements is white light. A set-up using a commercially available DMS instrument from Autronic-Melchers, Germany, is used here. The characteristic voltages have been determined under perpendicular observation. The threshold (V$_{10}$), mid-grey (V$_{50}$) and saturation (V$_{90}$) voltages have been determined for 10%, 50% and 90% relative contrast, respectively.

The liquid-crystal media according to the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and compounds of the liquid-crystal media in this application.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

By addition of suitable additives, the liquid-crystal media according to the present invention can be modified in such a way that they can be used in all known types of liquid-crystal displays, either using the liquid-crystal media as such, such as TN, TN-AMD, ECB-AMD, VAN-AMD, IPS-AMD, FFS-AMD LCDs, or in composite systems, such as PDLC, NCAP, PN LCDs and especially in ASM-PA LCDs.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also called acronyms. In these acronyms, the chemical formulae are abbreviated as follows using Tables A to C below. AU groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups. Table C lists the meanings of the codes for the left-hand or right-hand end groups. Table D shows illustrative structures of compounds together with their respective abbreviations.

TABLE A

| | Ring elements |
|---|---|
| C | |
| D | |
| Dl | |
| A | |
| Al | |
| P | |
| G | |
| Gl | |
| U | |
| Ul | |
| Y | |

TABLE A-continued
Ring elements
M 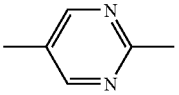
Ml 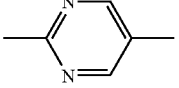
N 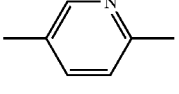
Nl 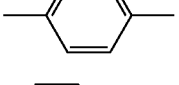
Np 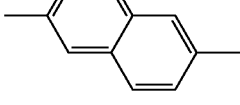
N3f 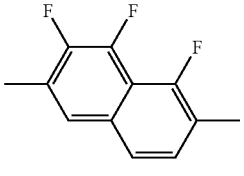
N3fl 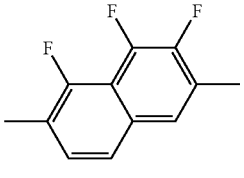
tH 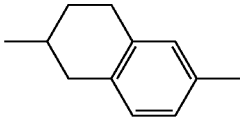
tHl 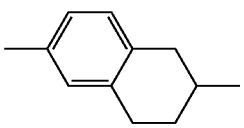
tH2f 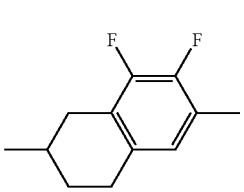
tH2fl 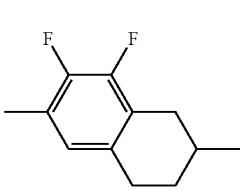
dH
K
Kl
nC
nCl
L
Ll
F
Fl
TABLE B
Linking groups
| | | | |
|---|---|---|---|
| E | —CH$_2$CH$_2$— | Z | —CO—O— |
| V | —CH═CH— | ZI | —O—CO— |
| X | —CF═CH— | O | —CH$_2$—O— |
| XI | —CH═CF— | OI | —O—CH$_2$— |
| B | —CF═CF— | Q | —CF$_2$—O— |
| T | —C≡C— | QI | —O—CF$_2$— |
| W | —CF$_2$CF$_2$— | T | —C≡C— |

TABLE C

| End groups | | | |
|---|---|---|---|
| Left-hand side | | Right-hand side | |
| Use alone | | | |
| -n- | $C_nH_{2n+1}$— | -n | —$C_nH_{2n+1}$ |
| -nO- | $C_nH_{2n+1}$—O— | -nO | —O—$C_nH_{2n+1}$ |
| -V- | $CH_2$=CH— | -V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n+1}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO- | $CFH_2O$— | -OM | —$OCFH_2$ |
| -DO- | $CF_2HO$— | -OD | —$OCF_2H$ |
| -TO- | $CF_3O$— | -OT | —$OCF_3$ |
| -OXF- | $CF_2$=CH—O— | -OXF | —O—CH=$CF_2$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |
| Use in combination with further | | | |
| -...A...- | —C≡C— | -...A... | —C≡C— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots "..." are spacers for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures $C_nH_{2n+1}$—[cyclohexyl]—[cyclohexyl]—$C_mH_{2m+1}$

CC-n-m $C_nH_{2n+1}$—[cyclohexyl]—[cyclohexyl]—O—$C_mH_{2m+1}$

CC-n-Om $C_nH_{2n+1}$—[cyclohexyl]—[cyclohexyl]—CH=$CH_2$

CC-n-V $C_nH_{2n+1}$—[cyclohexyl]—[cyclohexyl]—CH=CH—$C_mH_{2m+1}$

CC-n-Vm $C_nH_{2n+1}$—[cyclohexyl]—[cyclohexyl]—$(CH_2)_m$—CH=$CH_2$

CC-n-mV

TABLE D-continued

Illustrative structures $C_nH_{2n+1}$—⬡—⬡—$(CH_2)_m$—CH=CH—$C_lH_{2l+1}$
CC-n-mVl $H_2C$=CH—⬡—⬡—CH=$CH_2$
CC-V-V $CH_2$=CH—⬡—⬡—$(CH_2)_m$—CH=$CH_2$
CC-V-mV $CH_2$=CH—⬡—⬡—CH=CH—$C_mH_{2m+1}$
CC-V-Vm $CH_2$=CH—$(CH_2)_n$—⬡—⬡—$(CH_2)_m$—CH=$CH_2$
CC-Vn-mV $C_nH_{2n+1}$—CH=CH—⬡—⬡—$(CH_2)_m$—CH=$CH_2$
CC-nV-mV $C_nH_{2n+1}$—CH=CH—⬡—⬡—CH=CH—$C_mH_{2m+1}$
CC-nV-Vm $C_nH_{2n+1}$—⬡—⬢—$C_mH_{2m+1}$
CP-n-m $C_nH_{2n+1}$O—⬡—⬢—$C_mH_{2m+1}$
CP-nO-m $C_nH_{2n+1}$—⬡—⬢—O$C_mH_{2m+1}$
CP-n-Om $C_nH_{2n+1}$—⬢—⬢—$C_mH_{2m+1}$
PP-n-m $C_nH_{2n+1}$O—⬢—⬢—$C_mH_{2m+1}$
PP-nO-m $C_nH_{2n+1}$—⬢—⬢—O$C_mH_{2m+1}$
PP-n-Om TABLE D-continued
Illustrative structures
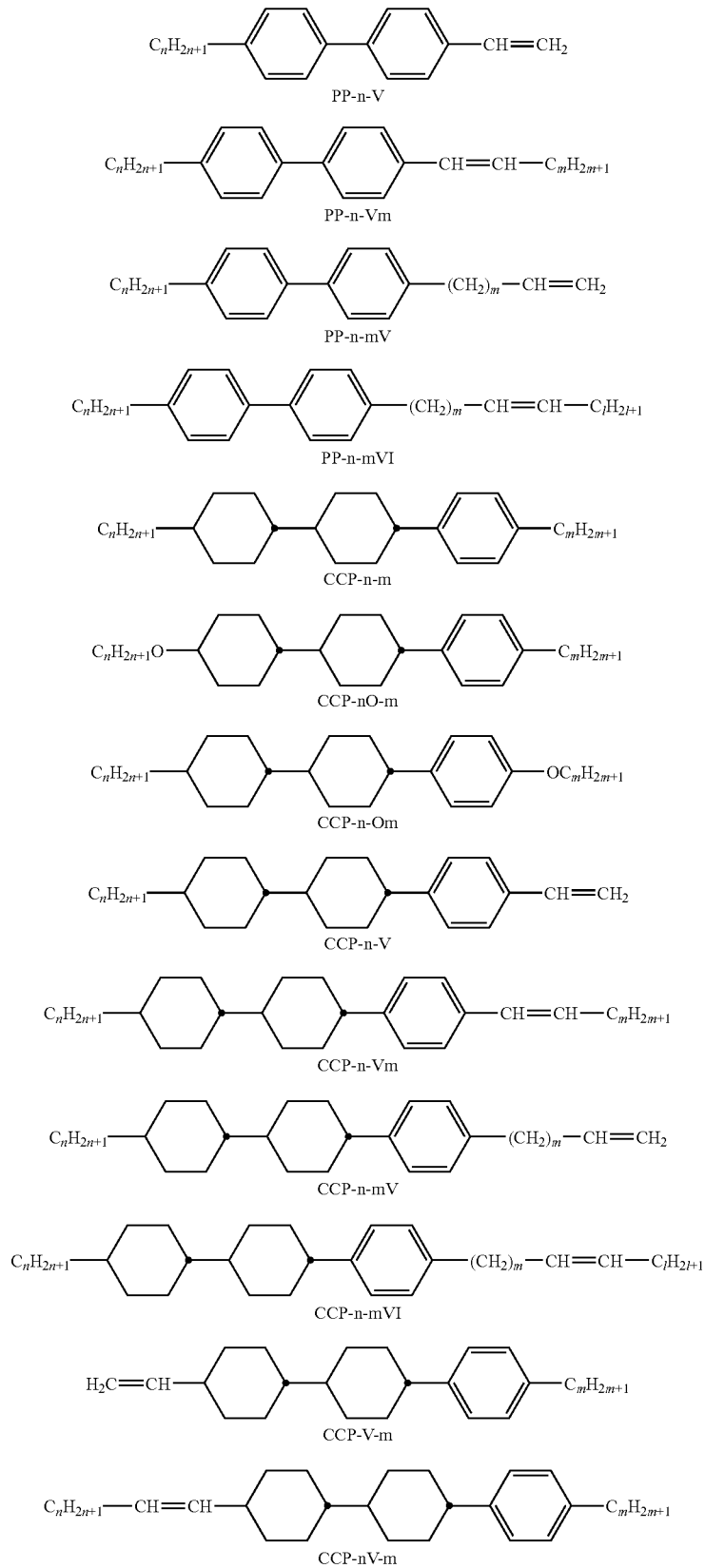

TABLE D-continued
Illustrative structures
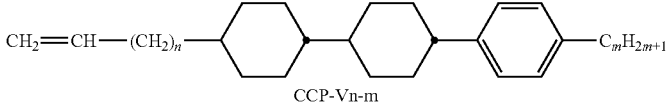
CCP-Vn-m
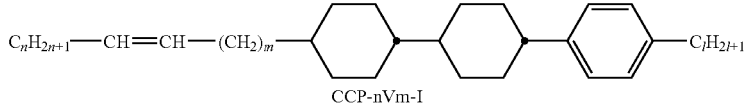
CCP-nVm-I
CPP-n-m
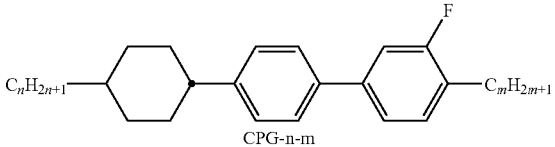
CPG-n-m
CGP-n-m
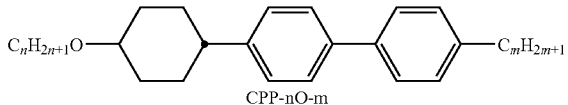
CPP-nO-m
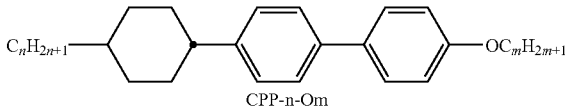
CPP-n-Om
CPP-V-m
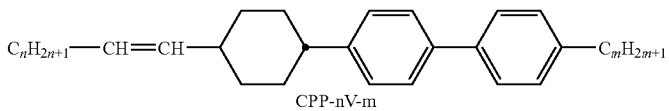
CPP-nV-m
CPP-Vn-m
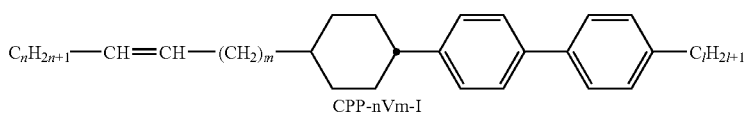
CPP-nVm-I
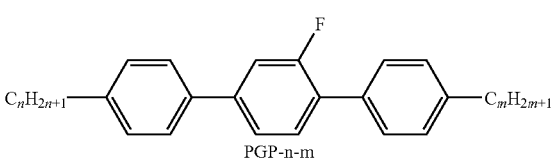
PGP-n-m TABLE D-continued Illustrative structures $C_nH_{2n+1}$—⟨Cy⟩—⟨Ph⟩—⟨Ph⟩—⟨Cy⟩—$C_mH_{2m+1}$
CPPC-n-m $C_nH_{2n+1}$—⟨Cy⟩—⟨Ph⟩(F)—⟨Ph⟩—⟨Cy⟩—$C_mH_{2m+1}$
CGPC-n-m $C_nH_{2n+1}$—⟨Cy⟩—⟨Cy⟩—⟨Ph⟩—⟨Cy⟩—$C_mH_{2m+1}$
CCPC-n-m $C_nH_{2n+1}$—⟨Cy⟩—⟨Cy⟩—CO—O—⟨Ph⟩—⟨Cy⟩—$C_mH_{2m+1}$
CCZPC-n-m $C_nH_{2n+1}$—⟨Cy⟩—⟨Ph⟩—⟨Ph⟩(F)—⟨Ph⟩—$C_mH_{2m+1}$
CPGP-n-m $C_nH_{2n+1}$—⟨Ph⟩—⟨Ph⟩(F)—⟨Ph⟩(F)—⟨Ph⟩—$C_mH_{2m+1}$
PGIGP-n-m $C_nH_{2n+1}$—⟨Cy⟩—⟨Ph⟩—F
CP-n-F $C_nH_{2n+1}$—⟨Cy⟩—⟨Ph⟩—Cl
CP-n-CL $C_nH_{2n+1}$—⟨Ph⟩(F)—⟨Ph⟩—F
GP-n-F $C_nH_{2n+1}$—⟨Ph⟩(F)—⟨Ph⟩—Cl
GP-n-CL $C_nH_{2n+1}$—⟨Cy⟩—⟨Cy⟩—⟨Ph⟩—OCF$_3$
CCP-n-OT TABLE D-continued
Illustrative structures
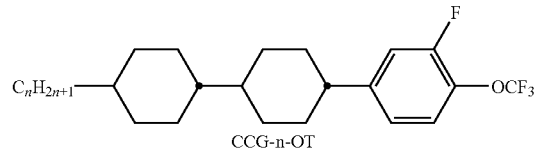
CCG-n-OT
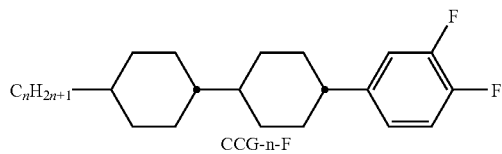
CCG-n-F
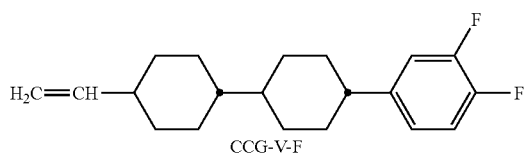
CCG-V-F
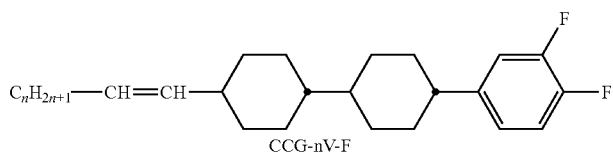
CCG-nV-F
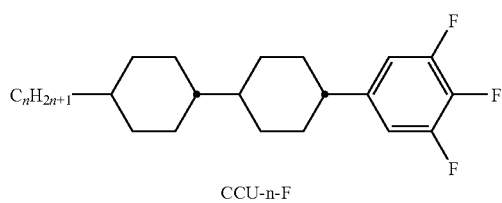
CCU-n-F
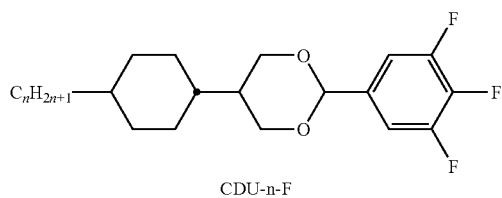
CDU-n-F
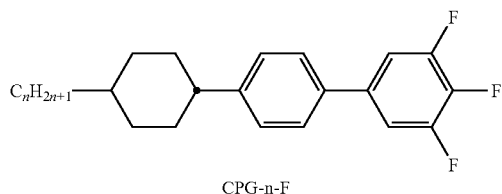
CPG-n-F
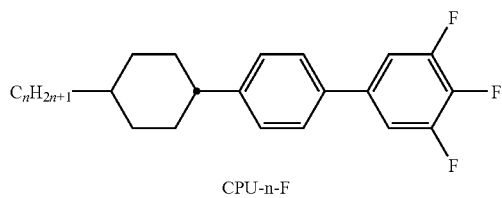
CPU-n-F TABLE D-continued
Illustrative structures
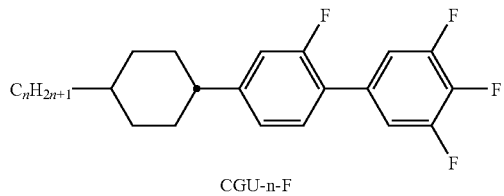
CGU-n-F
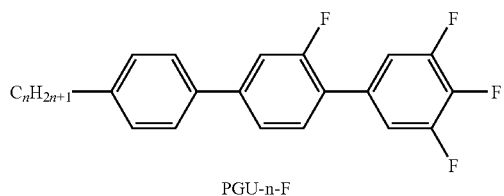
PGU-n-F
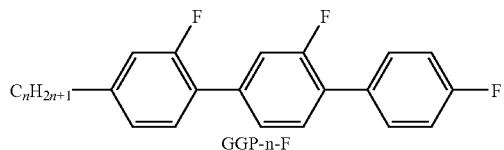
GGP-n-F
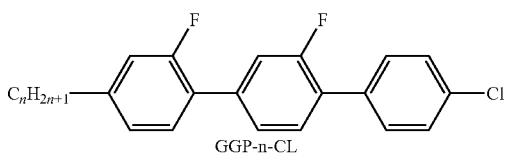
GGP-n-CL
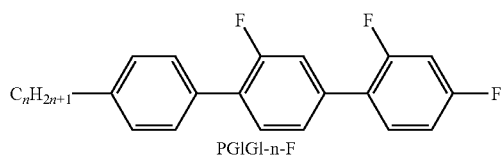
PGIGI-n-F
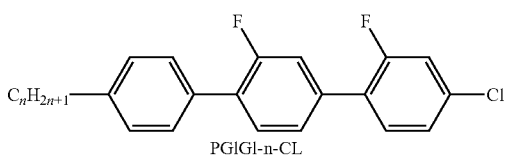
PGIGI-n-CL
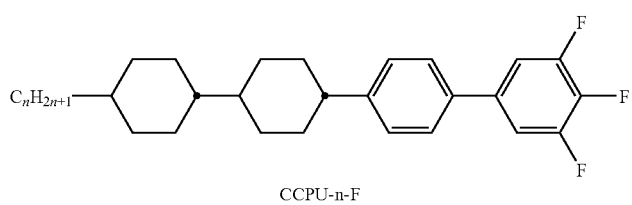
CCPU-n-F
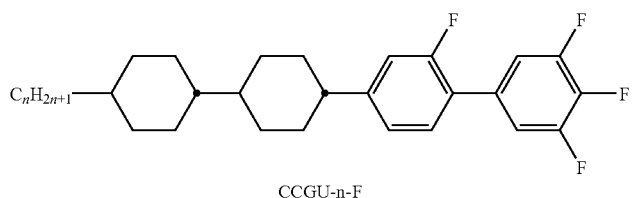
CCGU-n-F TABLE D-continued
Illustrative structures
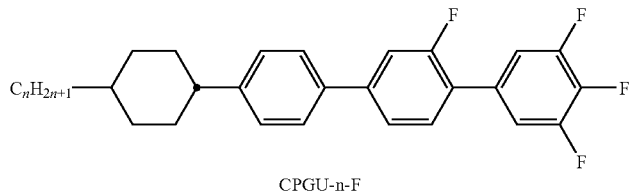
CPGU-n-F
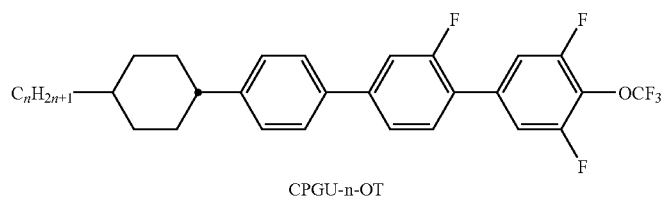
CPGU-n-OT
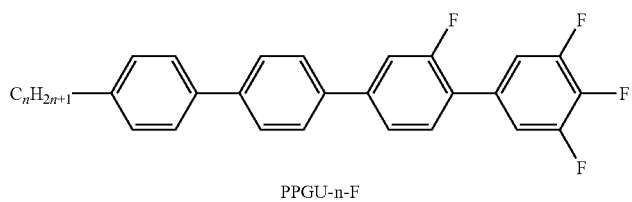
PPGU-n-F
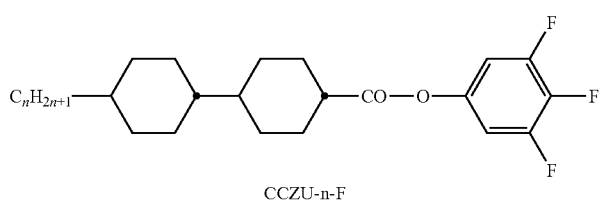
CCZU-n-F
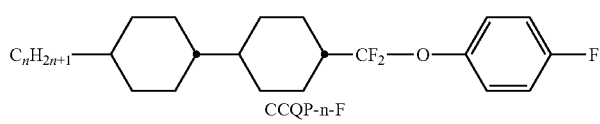
CCQP-n-F
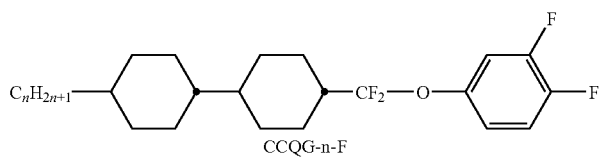
CCQG-n-F
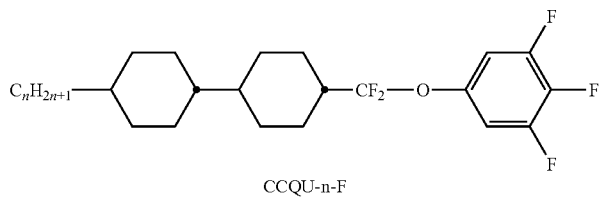
CCQU-n-F
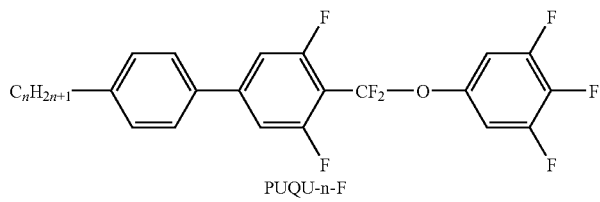
PUQU-n-F TABLE D-continued
Illustrative structures
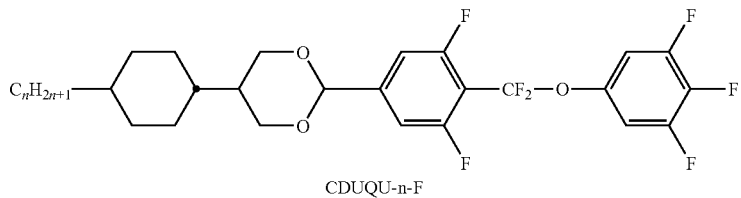
CDUQU-n-F
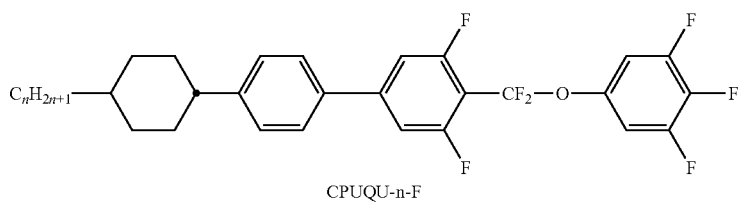
CPUQU-n-F
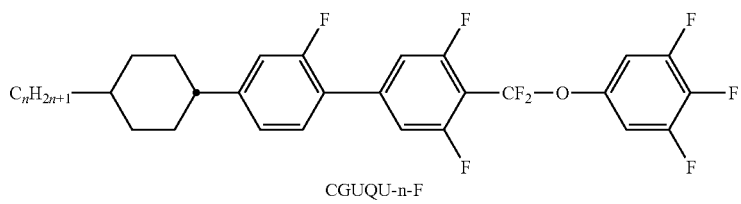
CGUQU-n-F
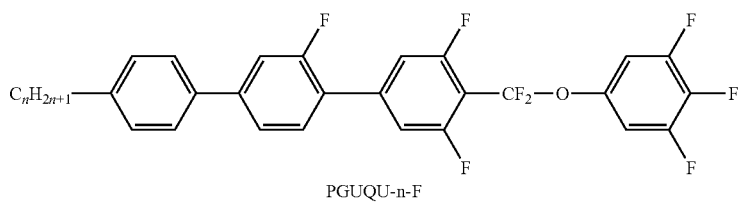
PGUQU-n-F
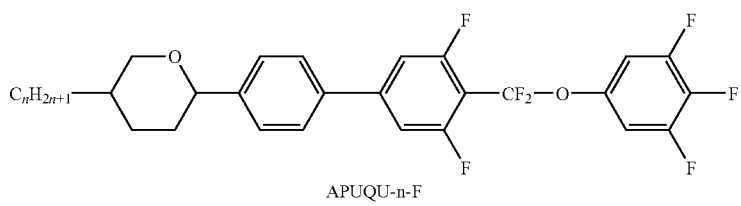
APUQU-n-F
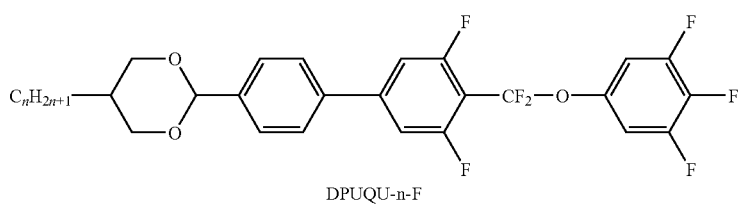
DPUQU-n-F
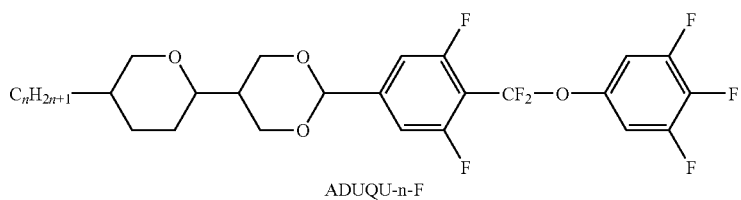
ADUQU-n-F TABLE D-continued
Illustrative structures
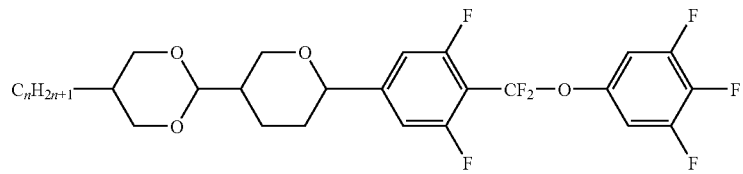
DAUQU-n-F
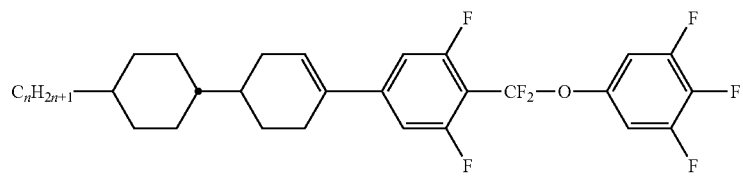
CLUQU-n-F
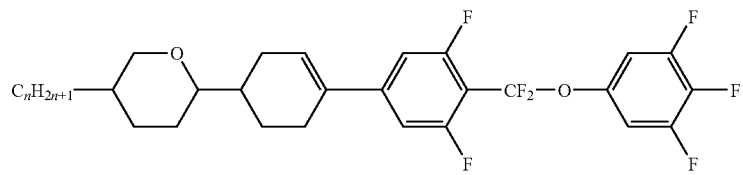
ALUQU-n-F
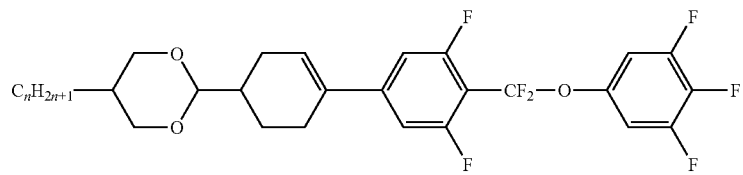
DLQU-n-F
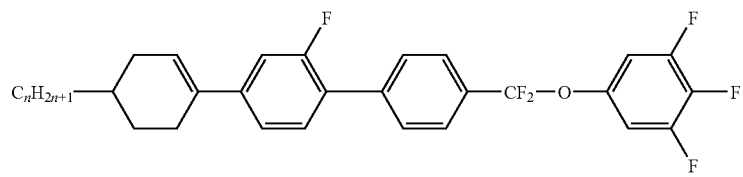
LGPQU-n-F The following table, Table E, shows illustrative compounds which can be used as stabiliser in the mesogenic media according to the present invention.
TABLE E
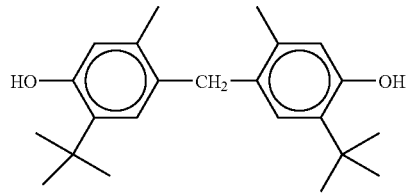
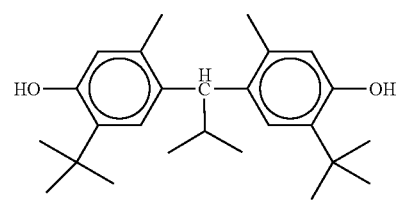
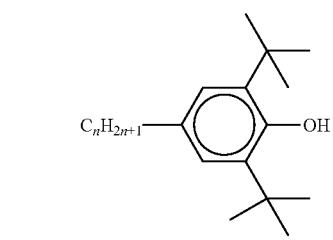
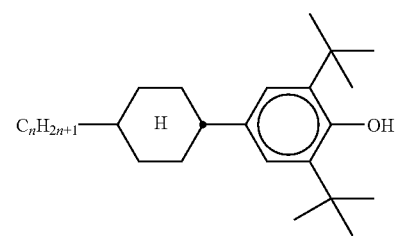
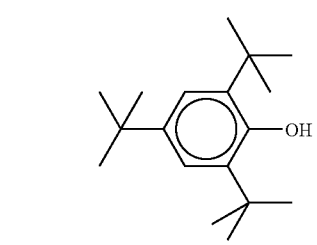
TABLE E-continued
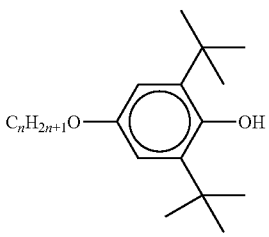
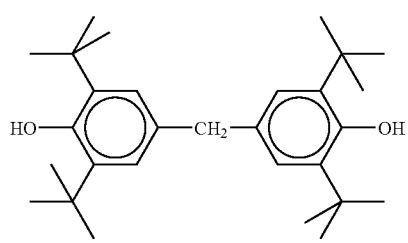
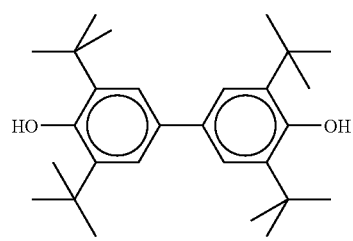
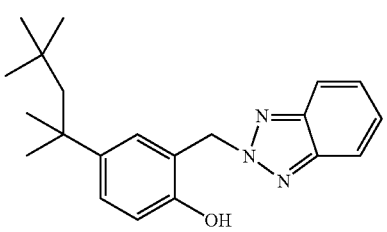 [SMILES: CC(C)(C)CC(C)(C)c1ccc(O)c(Cn2nc3ccccc3n2)c1]
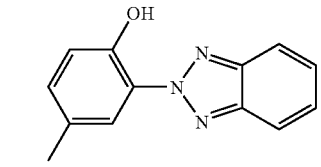 [SMILES: Cc1ccc(O)c(-n2nc3ccccc3n2)c1]
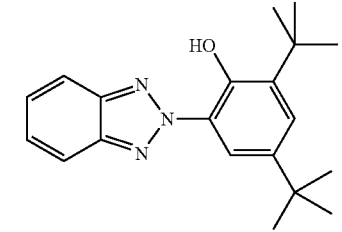 [SMILES: CC(C)(C)c1cc(-n2nc3ccccc3n2)c(O)c(C(C)(C)C)c1]

TABLE E-continued
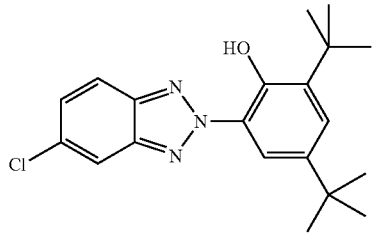 [SMILES: CC(C)(C)c1cc(-n2nc3ccc(Cl)cc3n2)c(O)c(C(C)(C)C)c1]
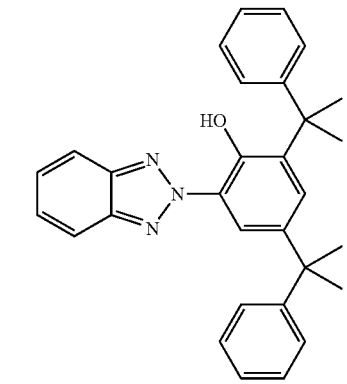 [SMILES: CC(C)(c1ccccc1)c1cc(-n2nc3ccccc3n2)c(O)c(C(C)(C)c2ccccc2)c1]
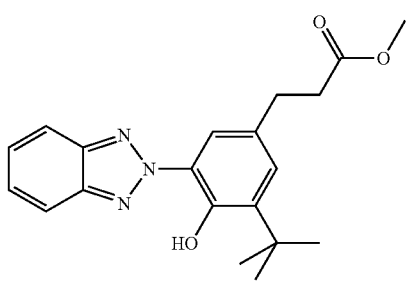 [SMILES: COC(=O)CCc1cc(-n2nc3ccccc3n2)c(O)c(C(C)(C)C)c1]
TABLE E-continued
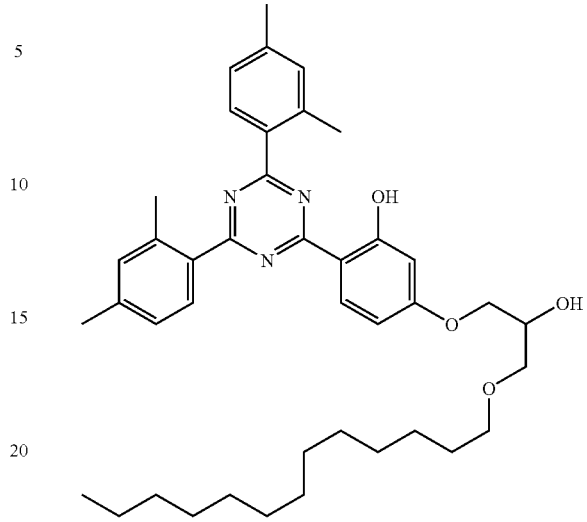
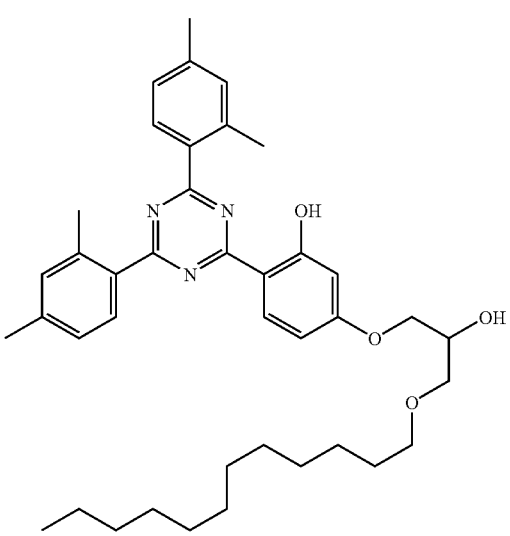 [SMILES: CCCCCCCCCCCCOCC(O)COc1ccc(-c2nc(-c3ccc(C)cc3C)nc(-c3ccc(C)cc3C)n2)c(O)c1]

TABLE E-continued

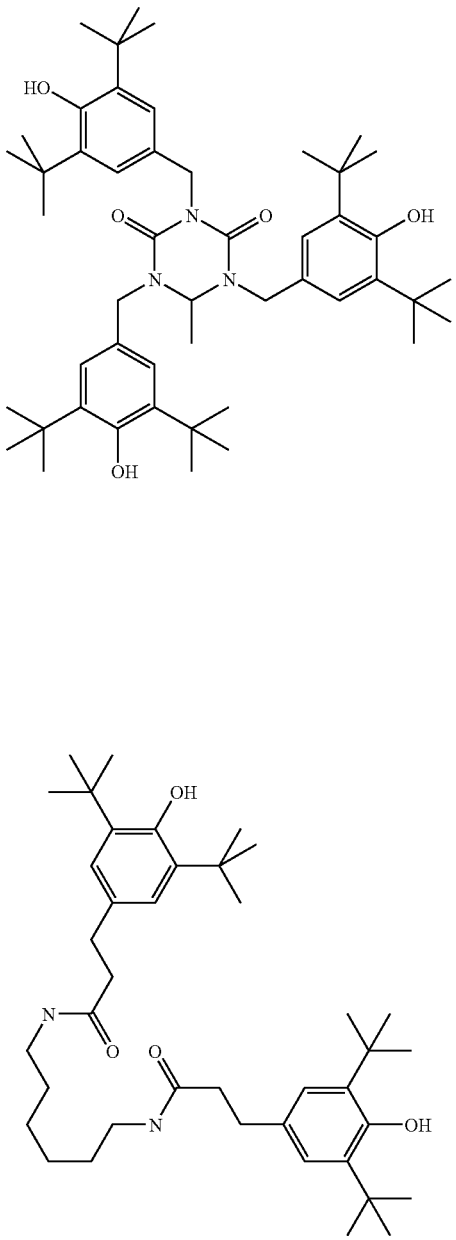

TABLE E-continued

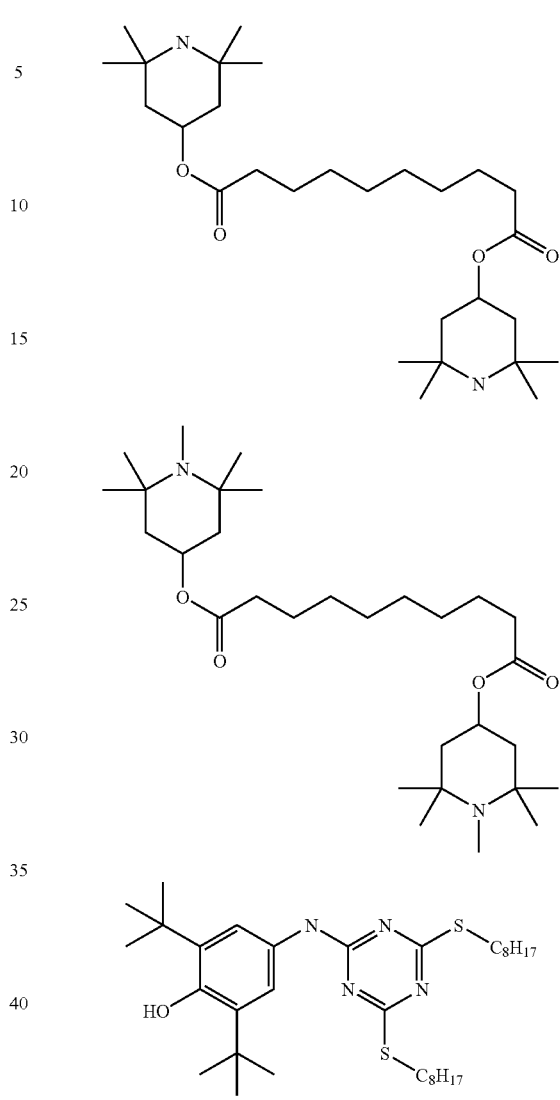

In a preferred embodiment of the present invention, the mesogenic media comprise one or more compounds selected from the group of the compounds from Table E.

The following table, Table F, shows illustrative compounds which can preferably be used as chiral dopants in the mesogenic media according to the present invention.

TABLE F

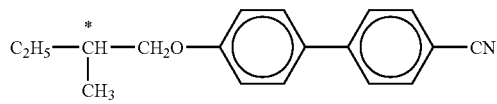

C 15

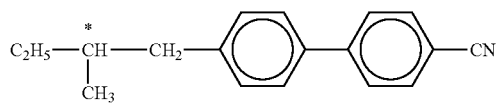

CB 15

TABLE F-continued
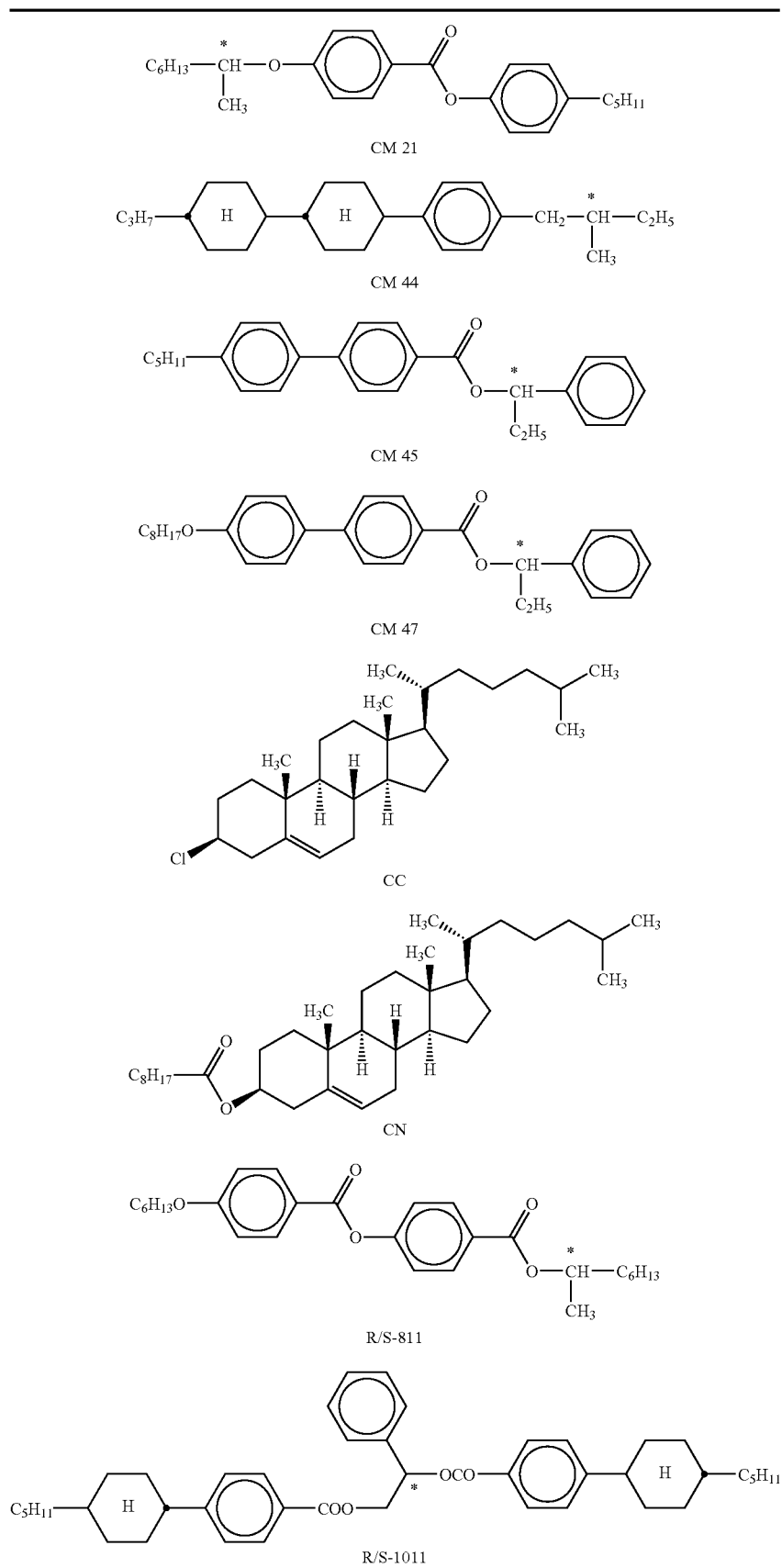

TABLE F-continued

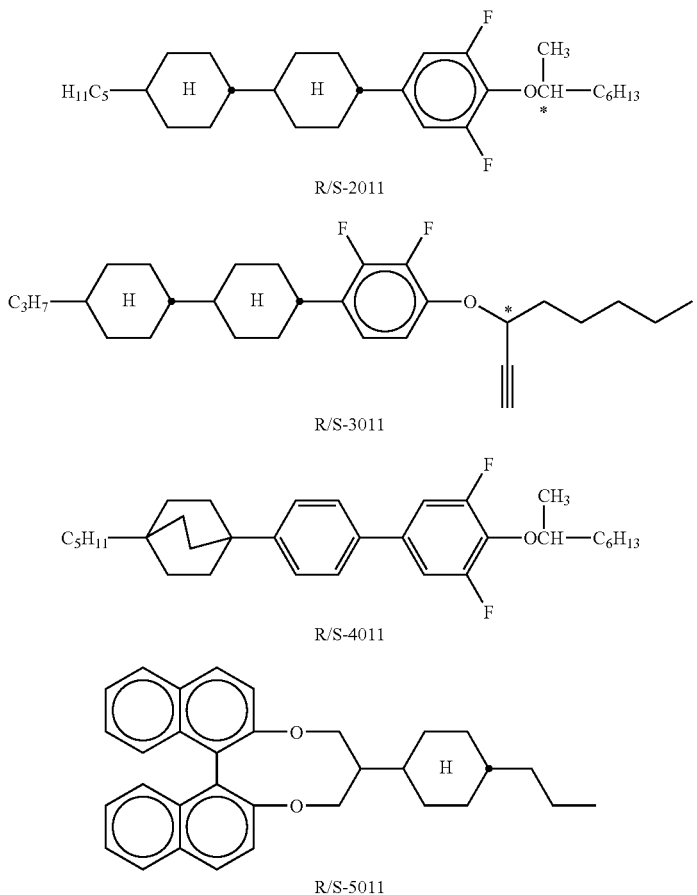

R/S-2011

R/S-3011

R/S-4011

R/S-5011

In a preferred embodiment of the present invention, the mesogenic media comprise one or more compounds selected from the group of the compounds from Table F.

The mesogenic media according to the present application preferably comprise two or more, preferably four or more, compounds selected from the group consisting of the compounds from the above tables.

The liquid-crystal media according to the present invention preferably comprise seven or more, preferably eight or more, compounds, preferably compounds having three or more, preferably four or more, different formulae, selected from the group of the compounds from Table D.

EXAMPLES

The examples below illustrate the present invention without limiting it in any way.

However, the physical properties show the person skilled in the art what properties can be achieved and in what ranges they can be modified. In particular, the combination of the various properties which can preferably be achieved is thus well defined for the person skilled in the art.

Example 1

A liquid-crystal mixture having the composition and properties as indicated in the following table is prepared.

| No. | Composition Compound Abbreviation | |
|---|---|---|
| 1 | ALUQU-3-F | 8.0 |
| 2 | CPU-3-F | 18.0 |
| 3 | CPU-5-F | 10.0 |
| 4 | GGP-3-CL | 5.0 |
| 5 | CCQU-2-F | 10.0 |
| 6 | CCQU-3-F | 11.0 |
| 7 | APUQU-2-F | 13.0 |
| 8 | CC-3-V | 10.0 |
| 9 | PP-1-2V1 | 8.0 |
| 10 | PGP-2-3 | 2.0 |
| 11 | PGP-2-4 | 5.0 |
| Σ | | 100.0 |

| Physical properties | |
|---|---|
| T (N, I) = | 75.5° C. |
| $\Delta n$ (20° C., 589.3 nm) = | 0.1337 |
| $\epsilon_{\parallel}$ (20° C., 1 kHz) = | 19.1 |
| $\Delta\epsilon$ (20° C., 1 kHz) = | 15.0 |
| $\gamma_1$ (20° C.) = | 137 mPa · s |
| $V_{10}$ (20° C.) = | 1.09 V |
| $V_{90}$ (20° C.) = | 1.67 V |

This mixture is very highly suitable for displays in TN mode and in particular for displays for use in notebooks (3.3 V drivers).

Example 2

A liquid-crystal mixture having the composition and properties as indicated in the following table is prepared.

| Composition Compound | | |
|---|---|---|
| No. | Abbreviation | |
| 1 | CLUQU-3-F | 8.0 |
| 2 | CCP-3-OT | 8.0 |
| 3 | CCU-2-F | 11.0 |
| 4 | PGU-3-F | 6.0 |
| 5 | CCGU-3-F | 6.0 |
| 6 | CCQU-2-F | 11.0 |
| 7 | CCQU-3-F | 14.0 |
| 8 | PUQU-3-F | 16.0 |
| 9 | CC-3-V | 10.0 |
| 10 | CC-3-V1 | 6.0 |
| 11 | PGP-2-4 | 2.0 |
| 12 | CPPC-3-3 | 2.0 |
| Σ | | 100.0 |
| Physical properties | | |
| $T (N, I) =$ | | 82° C. |
| $\Delta n$ (20° C., 589.3 nm) = | | 0.1040 |
| $\epsilon_{\parallel}$ (20° C., 1 kHz) = | | 18.4 |
| $\Delta\epsilon$ (20° C., 1 kHz) = | | 14.4 |
| $\gamma_1$ (20° C.) = | | 122 mPa·s |
| $V_{10}$ (20° C.) = | | 1.11 V |
| $V_{90}$ (20° C.) = | | 1.72 V |

This mixture is very highly suitable for displays in TN mode and in particular for displays for use in notebooks (3.3 V drivers).

Example 3

A liquid-crystal mixture having the composition and properties as indicated in the following table is prepared.

| Composition Compound | | |
|---|---|---|
| No. | Abbreviation | |
| 1 | ALUQU-3-F | 8.0 |
| 2 | CCP-3-OT | 8.5 |
| 3 | CCU-2-F | 10.0 |
| 4 | PGU-3-F | 6.0 |
| 5 | CCGU-3-F | 8.0 |
| 6 | CCQU-2-F | 11.0 |
| 7 | CCQU-3-F | 15.0 |
| 8 | PUQU-3-F | 16.0 |
| 9 | CC-3-V | 10.0 |
| 10 | CC-3-V1 | 6.0 |
| 11 | CPPC-3-3 | 1.5 |
| Σ | | 100.0 |
| Physical properties | | |
| $T (N, I) =$ | | 80.5° C. |
| $\Delta n$ (20° C., 589.3 nm) = | | 0.0997 |
| $\epsilon_{\parallel}$ (20° C., 1 kHz) = | | 19.5 |
| $\Delta\epsilon$ (20° C., 1 kHz) = | | 15.3 |
| $\gamma_1$ (20° C.) = | | 125 mPa·s |
| $V_{10}$ (20° C.) = | | 1.05 V |
| $V_{90}$ (20° C.) = | | 1.64 V |

This mixture is very highly suitable for displays in TN mode and in particular for displays for use in notebooks (3.3 V drivers).

Example 4

A liquid-crystal mixture having the composition and properties as indicated in the following table is prepared.

| Composition Compound | | |
|---|---|---|
| No. | Abbreviation | |
| 1 | ALUQU-4-F | 10.00 |
| 2 | CCU-3-F | 7.00 |
| 3 | CCGU-3-F | 3.00 |
| 4 | CCQG-2-F | 4.00 |
| 5 | CCQU-3F | 9.00 |
| 6 | CCQU-5F | 9.00 |
| 7 | PUQU-3-F | 5.00 |
| 8 | PUQU-2-F | 10.00 |
| 9 | ACQU-2-F | 5.00 |
| 10 | ACQU-3-F | 7.00 |
| 11 | ACQU-4-F | 4.00 |
| 12 | APUQU-3-F | 3.00 |
| 13 | CC-3-4 | 5.00 |
| 14 | CC-3-V1 | 11.00 |
| 15 | CCP-V-1 | 8.00 |
| Σ | | 100.00 |
| Physical properties | | |
| $T (N, I) =$ | | 86° C. |
| $n_e$ (20° C., 589.3 nm) = | | 1.5631 |
| $\Delta n$ (20° C., 589.3 nm) = | | 0.0915 |
| $\epsilon_{\parallel}$ (20° C., 1 kHz) = | | 21.7 |
| $\Delta\epsilon$ (20° C., 1 kHz) = | | 17.4 |
| $\gamma_1$ (20° C.) = | | 146 mPa·s |
| $k_1$ (20° C.) = | | 12.2 pN |
| $k_3/k_1$ (20° C.) = | | 1.09 |
| $V_0$ (20° C.) = | | 0.89 V |

Example 5

A liquid-crystal mixture having the composition and properties as indicated in the following table is prepared.

| Composition Compound | | |
|---|---|---|
| No. | Abbreviation | |
| 1 | ALUQU-4-F | 11.00 |
| 2 | CCU-3-F | 7.00 |
| 3 | CCGU-3-F | 3.00 |
| 4 | CCQG-2-F | 4.00 |
| 5 | CCQU-3F | 9.00 |
| 6 | CCQU-5F | 10.00 |
| 7 | PUQU-2-F | 9.00 |
| 8 | PUQU-3-F | 5.00 |
| 9 | ACQU-2-F | 4.00 |
| 10 | ACQU-3-F | 7.00 |
| 11 | ACQU-4-F | 4.00 |
| 12 | APUQU-3-F | 3.00 |
| 13 | CC-3-4 | 2.00 |
| 14 | CC-4-V | 10.00 |
| 15 | CCP-V-1 | 12.00 |
| Σ | | 100.00 |

-continued

| Physical properties | |
|---|---|
| T (N, I) = | 87° C. |
| $n_e$ (20° C., 589.3 nm) = | 1.5650 |
| $\Delta n$ (20° C., 589.3 nm) = | 0.0912 |
| $\epsilon_{||}$ (20° C., 1 kHz) = | 21.1 |
| $\Delta\epsilon$ (20° C., 1 kHz) = | 16.8 |
| $\gamma_1$ (20° C.) = | 150 mPa·s |
| $k_1$ (20° C.) = | 11.5 pN |
| $k_3/k_1$ (20° C.) = | 1.10 |
| $V_0$ (20° C.) = | 0.87 V |

Example 6

A liquid-crystal mixture having the composition and properties as indicated in the following table is prepared.

| Composition Compound | | |
|---|---|---|
| No. | Abbreviation | |
| 1 | ALUQU-4-F | 9.00 |
| 2 | CLUQU-3-F | 5.00 |
| 3 | CLUQU-4-F | 6.00 |
| 4 | CCQU-3-F | 10.00 |
| 5 | PUQU-2-F | 5.00 |
| 6 | PUQU-3-F | 4.00 |
| 7 | ACQU-2-F | 7.00 |
| 8 | ACQU-3-F | 7.00 |
| 9 | APUQU-3-F | 8.00 |
| 10 | CC-3-V1 | 10.00 |
| 11 | CC-4-V | 11.00 |
| 12 | CC-5-V | 9.00 |
| 13 | CCP-V-1 | 9.00 |
| Σ | | 100.00 |

| Physical properties | |
|---|---|
| T (N, I) = | 87° C. |
| $n_e$ (20° C., 589.3 nm) = | 0.0905 |
| $\Delta n$ (20° C., 589.3 nm) = | 1.5655 |
| $\epsilon_{||}$ (20° C., 1 kHz) = | 19.0 |
| $\Delta\epsilon$ (20° C., 1 kHz) = | 15.4 |
| $\gamma_1$ (20° C.) = | 124 mPa·s |
| $k_1$ (20° C.) = | 13.0 pN |
| $k_3/k_1$ (20° C.) = | 1.09 |
| $V_0$ (20° C.) = | 0.98 V |

Example 7

A liquid-crystal mixture having the composition and properties as indicated in the following table is prepared.

| Composition Compound | | |
|---|---|---|
| No. | Abbreviation | |
| 1 | ALUQU-4-F | 7.00 |
| 2 | ALUQU-3-F | 6.00 |
| 3 | CCU-3-F | 8.00 |
| 4 | CGU-2-F | 4.00 |
| 5 | CCGU-3-F | 4.00 |
| 6 | CCQG-2-F | 4.00 |
| 7 | CCQU-3-F | 9.00 |
| 8 | CCQU-5-F | 9.00 |
| 9 | PUQU-3-F | 5.00 |
| 10 | PUQU-2-F | 5.00 |
| 11 | ACQU-2-F | 5.00 |
| 12 | ACQU-3-F | 5.00 |
| 13 | ACQU-4-F | 4.00 |
| 14 | CC-3-V1 | 6.00 |
| 15 | CC-4-V | 9.00 |
| 16 | CCP-V-1 | 10.00 |
| Σ | | 100.00 |

| Physical properties | |
|---|---|
| T (N, I) = | 87.5° C. |
| $n_e$ (20° C., 589.3 nm) = | 1.5364 |
| $\Delta n$ (20° C., 589.3 nm) = | 0.0900 |
| $\epsilon_{||}$ (20° C., 1 kHz) = | 19.6 |
| $\Delta\epsilon$ (20° C., 1 kHz) = | 15.4 |
| $\gamma_1$ (20° C.) = | 146 mPa·s |
| $k_1$ (20° C.) = | 11.4 pN |
| $k_3/k_1$ (20° C.) = | 1.19 |
| $V_0$ (20° C.) = | 0.91 V |

Example 8

A liquid-crystal mixture having the composition and properties as indicated in the following table is prepared.

| Composition Compound | | |
|---|---|---|
| No. | Abbreviation | |
| 1 | ALUQU-3-F | 5.00 |
| 2 | ALUQU-4-F | 5.00 |
| 3 | CCP-2-OT | 8.00 |
| 4 | CCP-3-OT | 8.00 |
| 5 | GGP-3-CL | 1.00 |
| 6 | CCQG-3-F | 10.00 |
| 7 | CCQU-3-F | 15.00 |
| 8 | PUQU-3-F | 17.00 |
| 9 | ACQU-3-F | 6.00 |
| 10 | ACQU-4-F | 6.00 |
| 11 | CC-3-V1 | 10.00 |
| 12 | CC-4-V | 7.00 |
| 13 | CCZPC-3-3 | 2.00 |
| Σ | | 100.00 |

| Physical properties | |
|---|---|
| T (N, I) = | 87° C. |
| $n_e$ (20° C., 589.3 nm) = | 1.5587 |
| $\Delta n$ (20° C., 589.3 nm) = | 0.0906 |
| $\epsilon_{||}$ (20° C., 1 kHz) = | 18.8 |
| $\Delta\epsilon$ (20° C., 1 kHz) = | 14.7 |
| $k_1$ (20° C.) = | 12.5 pN |
| $k_3/k_1$ (20° C.) = | 1.10 |
| $V_0$ (20° C.) = | 0.97 V |

Example 9

A liquid-crystal mixture having the composition and properties as indicated in the following table is prepared.

| Composition Compound | | |
|---|---|---|
| No. | Abbreviation | |
| 1 | ALUQU-2-F | 12.00 |
| 2 | ALUQU-3-F | 12.00 |
| 3 | CP-3-CL | 2.00 |
| 4 | CCP-2-OT | 8.00 |
| 5 | CCP-3-OT | 4.00 |
| 6 | CCQG-3-F | 6.00 |
| 7 | CCQU-3-F | 16.00 |
| 8 | CCQU-5-F | 3.00 |
| 9 | PUQU-3-F | 12.00 |
| 10 | CC-3-V1 | 8.00 |
| 11 | CC-4-V | 14.00 |
| 12 | CCZPC-3-3 | 3.00 |
| Σ | | 100.00 |

| Physical properties | |
|---|---|
| T(N, I) = | 88.5° C. |
| $n_e$ (20° C., 589.3 nm) = | 1.5616 |
| $\Delta n$ (20° C., 589.3 nm) = | 0.0912 |
| $\epsilon_{\parallel}$ (20° C., 1 kHz) = | 19.2 |
| $\Delta\epsilon$ (20° C., 1 kHz) = | 15.2 |
| $\gamma_1$ (20° C.) = | 131 mPa·s |
| $k_1$ (20° C.) = | 12.5 pN |
| $k_3/k_1$ (20° C.) = | 1.13 |
| $V_0$ (20° C.) = | 0.96 V |

Example 10

A liquid-crystal mixture having the composition and properties as indicated in the following table is prepared.

| Composition Compound | | |
|---|---|---|
| No. | Abbreviation | |
| 1 | ALUQU-3-F | 5.00 |
| 2 | ALUQU-4-F | 4.00 |
| 3 | GGP-3-CL | 6.00 |
| 4 | GGP-5-CL | 3.00 |
| 5 | PGU-2-F | 4.00 |
| 6 | PGU-3-F | 4.00 |
| 7 | PGU-5-F | 4.00 |
| 8 | CCGU-3-F | 1.00 |
| 9 | PUQU-2-F | 5.00 |
| 10 | PUQU-3-F | 8.00 |
| 11 | CC-3-V | 17.00 |
| 12 | CC-3-V1 | 4.00 |
| 13 | CC-5-V | 1.00 |
| 14 | PP-1-2V-1 | 2.00 |
| 15 | CPP-3-2 | 4.00 |
| 16 | CPP-5-2 | 2.00 |
| 17 | PGP-2-3 | 4.00 |
| 18 | PGP-2-4 | 4.00 |
| Σ | | 100.00 |

| Physical properties | |
|---|---|
| T(N, I) = | 88.8° C. |
| $n_e$ (20° C., 589.3 nm) = | 1.6542 |
| $\Delta n$ (20° C., 589.3 nm) = | 0.1543 |
| $\epsilon_{\parallel}$ (20° C., 1 kHz) = | 14.6 |
| $\Delta\epsilon$ (20° C., 1 kHz) = | 10.8 |
| $\gamma_1$ (20° C.) = | 105 mPa·s |
| $k_1$ (20° C.) = | 13.6 pN |
| $k_3/k_1$ (20° C.) = | 1.71 |
| $V_0$ (20° C.) = | 1.19 V |

Example 11

A liquid-crystal mixture having the composition and properties as indicated in the following table is prepared.

| Composition Compound | | |
|---|---|---|
| No. | Abbreviation | |
| 1 | ALUQU-3-F | 10.00 |
| 2 | ALUQU-4-F | 6.00 |
| 3 | CP-3-CL | 10.00 |
| 4 | CPU-3-F | 25.00 |
| 5 | CGU-2-F | 10.00 |
| 6 | PUQU-3-F | 5.00 |
| 7 | CCP-V2-1 | 4.00 |
| 8 | PGP-2-4 | 6.00 |
| 9 | PGP-2-3 | 6.00 |
| 10 | PGP-2-5 | 6.00 |
| 11 | CPGP-4-3 | 4.00 |
| 12 | CPGP-5-2 | 4.00 |
| 13 | CPGP-5-3 | 4.00 |
| Σ | | 100.00 |

| Physical properties | |
|---|---|
| T(N, I) = | 98° C. |
| $n_e$ (20° C., 589.3 nm) = | 1.6698 |
| $\Delta n$ (20° C., 589.3 nm) = | 0.1630 |
| $\epsilon_{\parallel}$ (20° C., 1 kHz) = | 16.8 |
| $\Delta\epsilon$ (20° C., 1 kHz) = | 12.7 |
| $k_1$ (20° C.) = | 15.5 pN |
| $k_3/k_1$ (20° C.) = | 0.86 |
| $V_0$ (20° C.) = | 1.17 V |

Example 12

A liquid-crystal mixture having the composition and properties as indicated in the following table is prepared.

| Composition Compound | | |
|---|---|---|
| No. | Abbreviation | |
| 1 | ALUQU-3-F | 7.00 |
| 2 | ALUQU-4-F | 14.00 |
| 3 | CLUQU-3-F | 7.00 |
| 4 | CC-3-V | 36.00 |
| 5 | PP-1-2V1 | 6.00 |
| 6 | PGP-2-3 | 7.00 |
| 7 | PGP-2-4 | 7.00 |
| 8 | PGP-2-5 | 6.00 |
| 9 | CPGP-4-3 | 3.00 |

-continued

| | | |
|---|---|---|
| 10 | CPGP-5-2 | 3.00 |
| 11 | PGIGP-3-5 | 4.00 |
| Σ | | 100.00 |

| Physical properties | |
|---|---|
| T(N, I) = | 101° C. |
| $n_e$ (20° C., 589.3 nm) = | 1.6359 |
| Δn (20° C., 589.3 nm) = | 0.1415 |
| $\epsilon_\parallel$ (20° C., 1 kHz) = | 10.6 |
| Δε (20° C., 1 kHz) = | 7.4 |
| $\gamma_1$ (20° C.) = | 107 mPa·s |
| $k_1$ (20° C.) = | 18.5 pN |
| $k_3/k_1$ (20° C.) = | 0.85 |
| $V_0$ (20° C.) = | 1.67 V |

Example 13

A liquid-crystal mixture having the composition and properties as indicated in the following table is prepared.

| Composition Compound | | |
|---|---|---|
| No. | Abbreviation | |
| 1 | ALUQU-3-F | 9.00 |
| 2 | ALUQU-4-F | 9.00 |
| 3 | PUQU-3-F | 8.00 |
| 4 | CC-3-V | 36.00 |
| 5 | PP-1-2V1 | 6.00 |
| 6 | PGP-2-3 | 8.00 |
| 7 | PGP-2-4 | 8.00 |
| 8 | CPGP-4-3 | 6.00 |
| 9 | CPGP-5-2 | 5.00 |
| 10 | CPGP-5-3 | 5.00 |
| Σ | | 100.00 |

| Physical properties | |
|---|---|
| T(N, I) = | 99.5° C. |
| $n_e$ (20° C., 589.3 nm) = | 1.6382 |
| Δn (20° C., 589.3 nm) = | 0.1440 |
| $\epsilon_\parallel$ (20° C., 1 kHz) = | 10.6 |
| Δε (20° C., 1 kHz) = | 7.3 |
| $\gamma_1$ (20° C.) = | 108 mPa·s |
| $k_1$ (20° C.) = | 17.0 pN |
| $k_3/k_1$ (20° C.) = | 0.89 |
| $V_0$ (20° C.) = | 1.61 V |

Example 14

A liquid-crystal mixture having the composition and properties as indicated in the following table is prepared.

| Composition Compound | | |
|---|---|---|
| No. | Abbreviation | |
| 1 | ALUQU-3-F | 9.00 |
| 2 | ALUQU-4-F | 9.00 |
| 3 | CLUQU-3-F | 10.00 |
| 4 | CC-3-V | 34.00 |
| 5 | PP-1-2V1 | 8.00 |
| 6 | PGP-2-3 | 9.00 |
| 7 | PGP-2-4 | 9.00 |
| 8 | PGP-2-5 | 3.00 |
| 9 | CPGP-4-3 | 4.00 |
| 10 | CPGP-5-2 | 5.00 |
| Σ | | 100.00 |

| Physical properties | |
|---|---|
| T(N, I) = | 99.5° C. |
| $n_e$ (20° C., 589.3 nm) = | 1.6404 |
| Δn (20° C., 589.3 nm) = | 0.1446 |
| $\epsilon_\parallel$ (20° C., 1 kHz) = | 10.5 |
| Δε (20° C., 1 kHz) = | 7.3 |
| $\gamma_1$ (20° C.) = | 106 mPa·s |
| $k_1$ (20° C.) = | 19.4 pN |
| $k_3/k_1$ (20° C.) = | 0.84 |
| $V_0$ (20° C.) = | 1.72 V |

Example 15

A liquid-crystal mixture having the composition and properties as indicated in the following table is prepared.

| Composition Compound | | |
|---|---|---|
| No. | Abbreviation | |
| 1 | ALUQU-3-F | 6.00 |
| 2 | ALUQU-4F | 16.00 |
| 3 | CLUQU-3-F | 6.00 |
| 4 | PGIGI-3-F | 5.00 |
| 5 | CC-3-V | 33.00 |
| 6 | PP-1-2V1 | 6.00 |
| 7 | PGP-2-3 | 7.00 |
| 8 | PGP-2-4 | 7.00 |
| 9 | PGP-2-5 | 5.00 |
| 10 | CPGP-4-3 | 3.00 |
| 11 | CPGP-5-2 | 3.00 |
| 12 | CPGP-5-3 | 3.00 |
| Σ | | 100.00 |

| Physical properties | |
|---|---|
| T(N, I) = | 99° C. |
| $n_e$ (20° C., 589.3 nm) = | 1.6405 |
| Δn (20° C., 589.3 nm) = | 0.1453 |
| $\epsilon_\parallel$ (20° C., 1 kHz) = | 10.8 |
| Δε (20° C., 1 kHz) = | 7.6 |
| $\gamma_1$ (20° C.) = | 121 mPa·s |
| $k_1$ (20° C.) = | 18.1 pN |
| $k_3/k_1$ (20° C.) = | 0.86 |
| $V_0$ (20° C.) = | 1.63 V |

Example 16

A liquid-crystal mixture having the composition and properties as indicated in the following table is prepared.

| Composition Compound | | |
|---|---|---|
| No. | Abbreviation | |
| 1 | ALUQU-3-F | 6.00 |
| 2 | ALUQU-4F | 16.00 |

-continued

| | | |
|---|---|---|
| 3 | CLUQU-3-F | 6.00 |
| 4 | CC-3-V | 36.00 |
| 5 | PP-1-2V1 | 6.00 |
| 6 | PGP-2-3 | 7.00 |
| 7 | PGP-2-4 | 7.00 |
| 8 | PGP-2-5 | 5.00 |
| 9 | CPGP-4-3 | 3.00 |
| 10 | CPGP-5-2 | 3.00 |
| 11 | PGIGP-3-5 | 5.00 |
| Σ | | 100.00 |

| Physical properties | |
|---|---|
| T(N, I) = | 100° C. |
| $n_e$ (20° C., 589.3 nm) = | 1.6386 |
| Δn (20° C., 589.3 nm) = | 0.1439 |
| $\epsilon_{\parallel}$ (20° C., 1 kHz) = | 10.6 |
| Δε (20° C., 1 kHz) = | 7.4 |
| $\gamma_1$ (20° C.) = | 118 mPa·s |
| $k_1$ (20° C.) = | 18.3 pN |
| $k_3/k_1$ (20° C.) = | 0.85 |
| $V_0$ (20° C.) = | 1.67 V |

Example 17

A liquid-crystal mixture having the composition and properties as indicated in the following table is prepared.

| Composition Compound | | |
|---|---|---|
| No. | Abbreviation | |
| 1 | ALUQU-3-F | 7.0 |
| 2 | CDU-2-F | 6.0 |
| 3 | CCZU-3-F | 6.0 |
| 4 | PUQU-2-F | 8.5 |
| 5 | PUQU-3-F | 8.0 |
| 6 | CC-3-V | 36.0 |
| 7 | CC-3-V1 | 12.5 |
| 8 | CCP-V-1 | 12.0 |
| 9 | CCP-V2-1 | 4.0 |
| Σ | | 100.0 |

| Physical properties | |
|---|---|
| T(N, I) = | 69.5° C. |
| $n_e$ (20° C., 589.3 nm) = | 1.5609 |
| Δn (20° C., 589.3 nm) = | 0.0813 |
| $\epsilon_{\parallel}$ (20° C., 1 kHz) = | 10.7 |
| Δε (20° C., 1 kHz) = | 7.3 |
| $\gamma_1$ (20° C.) = | 53 mPa·s |
| $k_1$ (20° C.) = | 11.3 pN |
| $k_3/k_1$ (20° C.) = | 1.22 |
| $V_0$ (20° C.) = | 1.31 V |

This mixture is very highly suitable for displays in IPS and FFS mode.

Example 18

A liquid-crystal mixture having the composition and properties as indicated in the following table is prepared.

| Composition Compound | | |
|---|---|---|
| No. | Abbreviation | |
| 1 | ALUQU-3-F | 8.0 |
| 2 | CDU-2-F | 2.0 |
| 3 | PGU-2-F | 9.0 |
| 4 | PGU-3-F | 1.5 |
| 5 | PUQU-2-F | 7.5 |
| 6 | PUQU-3-F | 8.0 |
| 7 | CC-3-V | 29.0 |
| 8 | CC-3-V1 | 12.5 |
| 9 | CCP-V-1 | 12.5 |
| 10 | CCP-V2-1 | 10.0 |
| Σ | | 100.0 |

| Physical properties | |
|---|---|
| T(N, I) = | 73.5° C. |
| $n_e$ (20° C., 589.3 nm) = | 1.5859 |
| Δn (20° C., 589.3 nm) = | 0.0995 |
| $\epsilon_{\parallel}$ (20° C., 1 kHz) = | 11.8 |
| Δε (20° C., 1 kHz) = | 8.4 |
| $\gamma_1$ (20° C.) = | 62 mPa·s |
| $k_1$ (20° C.) = | 12.2 pN |
| $k_3/k_1$ (20° C.) = | 1.13 |
| $V_0$ (20° C.) = | 1.13 V |

This mixture is very highly suitable for displays in IPS and FFS mode.

Example 19

A liquid-crystal mixture having the composition and properties as indicated in the following table is prepared.

| Composition Compound | | |
|---|---|---|
| No. | Abbreviation | |
| 1 | CLUQU-3-F | 5.0 |
| 2 | PGU-2-F | 7.5 |
| 3 | PUQU-3-F | 15.0 |
| 4 | APUQU-3-F | 8.0 |
| 5 | CC-3-V | 32.0 |
| 6 | CC-3-V1 | 12.5 |
| 7 | CCP-V-1 | 11.0 |
| 8 | CCP-V2-1 | 9.0 |
| Σ | | 100.0 |

| Physical properties | |
|---|---|
| T(N, I) = | 75° C. |
| $n_e$ (20° C., 589.3 nm) = | 1.5830 |
| Δn (20° C., 589.3 nm) = | 0.0985 |
| $\epsilon_{\parallel}$ (20° C., 1 kHz) = | 11.8 |
| Δε (20° C., 1 kHz) = | 8.5 |
| $\gamma_1$ (20° C.) = | 62 mPa·s |
| $k_1$ (20° C.) = | 12.2 pN |

-continued

| | |
|---|---|
| k₃/k₁ (20° C.) = | 1.16 |
| V₀ (20° C.) = | 1.27 V |

This mixture is very highly suitable for displays in IPS and FFS mode.

Example 20

A liquid-crystal mixture having the composition and properties as indicated in the following table is prepared.

| Composition Compound | | |
|---|---|---|
| No. | Abbreviation | |
| 1 | DLUQU-3-F | 8.0 |
| 2 | PGU-2-F | 9.5 |
| 3 | PUQU-3-F | 15.5 |
| 4 | CC-3-V | 31.5 |
| 5 | CC-3-V1 | 12.0 |
| 6 | CCP-V-1 | 13.5 |
| 7 | CCP-V2-1 | 10.0 |
| Σ | | 100.0 |

| Physical properties | |
|---|---|
| T(N, I) = | 74° C. |
| $n_e$ (20° C., 589.3 nm) = | 1.5832 |
| Δn (20° C., 589.3 nm) = | 0.0981 |
| ε∥ (20° C., 1 kHz) = | 11.5 |
| Δε (20° C., 1 kHz) = | 8.2 |
| $\gamma_1$ (20° C.) = | 60 mPa·s |
| $k_1$ (20° C.) = | 12.5 pN |
| $k_3/k_1$ (20° C.) = | 1.14 |
| $V_0$ (20° C.) = | 1.29 V |

This mixture is very highly suitable for displays in IPS and FFS mode.

Example 21

A liquid-crystal mixture having the composition and properties as indicated in the following table is prepared.

| Composition Compound | | |
|---|---|---|
| No. | Abbreviation | |
| 1 | LGPQU-3-F | 8.5 |
| 2 | CDU-2-F | 4.5 |
| 3 | PGU-2-F | 4.5 |
| 4 | PUQU-3-F | 20.0 |
| 5 | CC-3-V | 29.5 |
| 6 | CC-3-V1 | 12.0 |
| 7 | CCP-V-1 | 13.5 |
| 8 | CCP-V2-1 | 7.5 |
| Σ | | 100.0 |

| Physical properties | |
|---|---|
| T(N, I) = | 73.5° C. |
| $n_e$ (20° C., 589.3 nm) = | 1.5849 |
| Δn (20° C., 589.3 nm) = | 0.0999 |
| ε∥ (20° C., 1 kHz) = | 11.6 |
| Δε (20° C., 1 kHz) = | 8.2 |
| $\gamma_1$ (20° C.) = | 62 mPa·s |
| $k_1$ (20° C.) = | 12.2 pN |
| $k_3/k_1$ (20° C.) = | 1.13 |
| $V_0$ (20° C.) = | 1.28 V |

This mixture is very highly suitable for displays in IPS and FFS mode.

Example 22

A liquid-crystal mixture having the composition and properties as indicated in the following table is prepared.

| Composition Compound | | |
|---|---|---|
| No. | Abbreviation | |
| 1 | CLUQU-3-F | 8.0 |
| 2 | PGU-3-F | 7.0 |
| 3 | ACQU-3-F | 9.0 |
| 4 | PUQU-3-F | 12.0 |
| 5 | CPGU-3-OT | 4.0 |
| 6 | PGUQU-3-F | 8.0 |
| 7 | APUQU-2-F | 6.0 |
| 8 | APUQU-3-F | 6.0 |
| 9 | CC-3-V | 33.0 |
| 10 | CCP-V-1 | 7.0 |
| Σ | | 100.0 |

| Physical properties | |
|---|---|
| T(N, I) = | 75° C. |
| Δn (20° C., 589.3 nm) = | 0.110 |
| Δε (20° C., 1 kHz) = | 19.0 |
| $\gamma_1$ (20° C.) = | 120 mPa·s |
| $V_{10}$ (20° C.) = | 0.98 V |

This mixture is very highly suitable for displays in TN mode and in particular for displays for use in notebooks (2.5 V drivers).

The invention claimed is:

1. Liquid-crystal medium, characterised in that it comprises one or more dielectrically positive compounds of the formula I

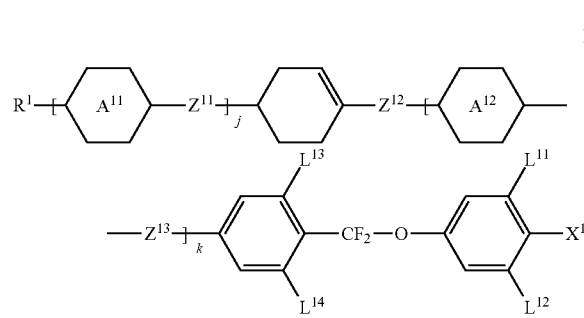

in which $R^1$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, $X^1$ denotes —CN, halogen, halogenated alkyl or halogenated alkoxy having 1 to 3 C atoms or halogenated alkenyl or halogenated alkenyloxy having 2 or 3 C atoms,

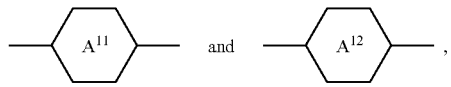

independently of one another and, if the rings $A^{11}$ and/or $A^{12}$ are present more than once, also these independently of one another, denote

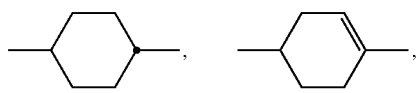

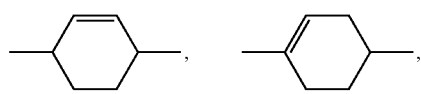

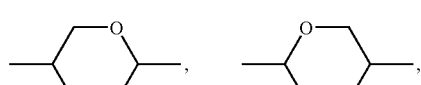

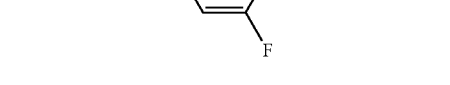

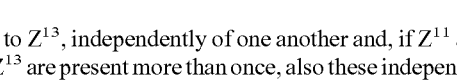

$Z^{11}$ to $Z^{13}$, independently of one another and, if $Z^{11}$ and/or $Z^{13}$ are present more than once, also these independently of one another, denote —CH$_2$CH$_2$—, —CF$_2$CF$_2$—, —COO—, trans--CH=CH—, trans-CF=CF—, —CF$_2$O—, —CH$_2$O— or a single bond, $L^{11}$ to $L^{14}$, independently of one another, denote H or F, and j and k, independently of one another, denote 0, 1 or 2, but where (j+k) denotes 0, 1 or 2.

2. Liquid-crystal medium according to claim 1, characterised in that it comprises one or more compounds selected from the group of the compounds of the formulae II and III:

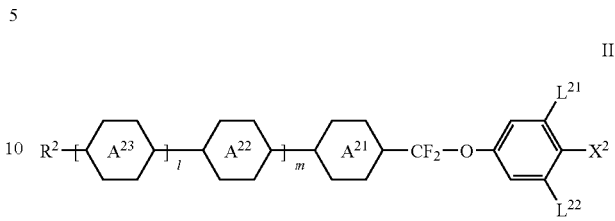

II

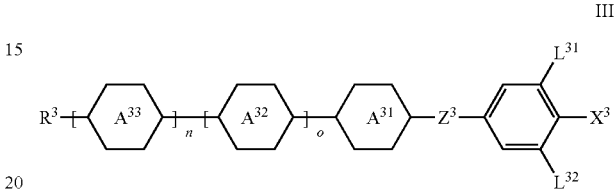

III in which $R^2$ and $R^3$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

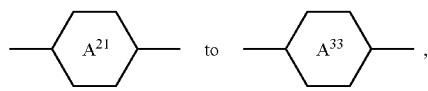

independently of one another, denote

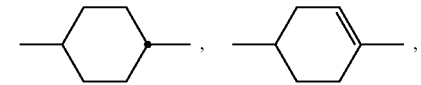

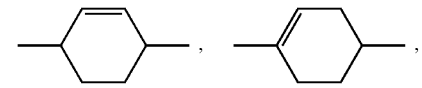

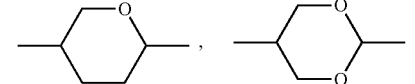

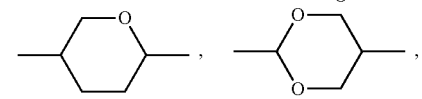

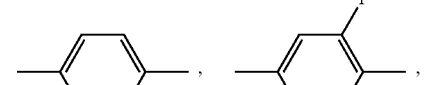

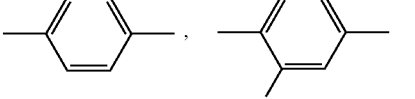

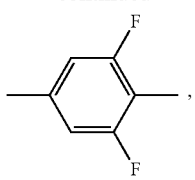

$L^{21}, L^{22}, L^{31}$ and $L^{32}$, independently of one another, denote H or F, $X^2$ and $X^3$, independently of one another, denote halogen, halogenated alkyl or alkoxy having 1 to 3 C atoms or halogenated alkenyl or alkenyloxy having 2 or 3 C atoms, $Z^3$ denotes —CH$_2$CH$_2$—, —CF$_2$CF$_2$—, —COO—, trans-CH=CH—, trans-CF=CF—, —CH$_2$O— or a single bond, and l, m, n and o, independently of one another, denote 0 or 1.

3. Liquid-crystal medium according to claim 1, characterised in that it comprises one or more compounds of the formula IV

IV in which $R^{41}$ and $R^{42}$, independently of one another, have the meaning indicated above for $R^2$ under formula II,

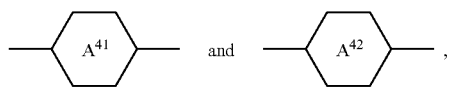

independently of one another and, in the case where

occur twice, also these independently of one another, denote

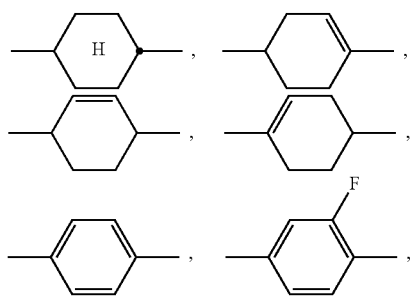

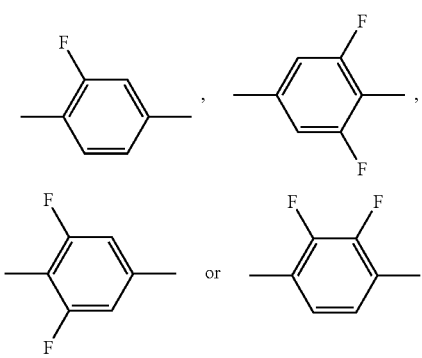

$Z^{41}$ and $Z^{42}$, independently of one another and, in the case where $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

4. Liquid-crystal medium according to claim 1, characterised in that the total concentration of the compounds of the formula I in the medium is in the range from 1% to 50%.

5. Liquid-crystal medium according to claim 1, characterised in that the medium comprises one or more compounds of the formula I in which $X^1$ denotes F.

6. Liquid-crystal medium according to claim 2, characterised in that it comprises one or more compounds of the formula II as indicated in claim 2.

7. Liquid-crystal medium according to claim 2, characterised in that it comprises one or more compounds of the formula III as indicated in claim 2.

8. Liquid-crystal medium according to claim 3, characterised in that it comprises one or more dielectrically neutral compounds of the formula IV as indicated in claim 3.

9. Liquid-crystal medium according to claim 1, characterised in that it comprises one or more compounds of the formula VI

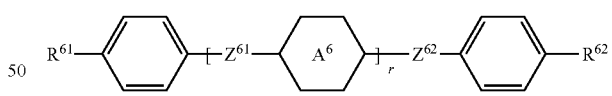

VI in which $R^{61}$ and $R^{62}$, independently of one another denote alkyl, alkoxy fluorinated alkyl or fluorinated alkoxy having 1 to 7 C atoms, alkenyl, alkenyloxy, alkoxyalkyl or fluorinated alkenyl having 2-7 C atoms,

and if it occurs twice, independently of one another on each occurrence, denotes

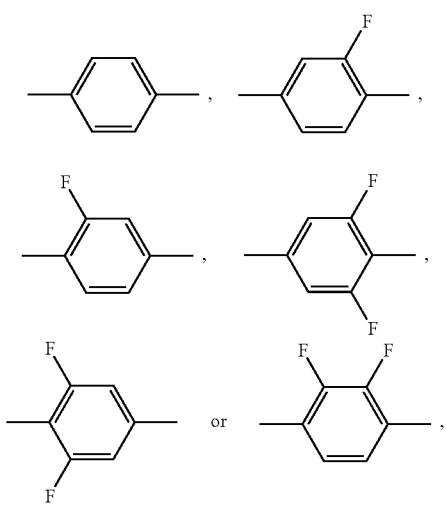

$Z^{61}$ and $Z^{62}$, independently of one another and, in the case where $Z^{61}$ occurs twice, also these independently of one another, denote —CH$_2$CH$_2$—, —COO—, trans-CH=CH—, trans-CF=CF—, —CH$_2$O—, —CF$_2$O— or a single bond, and r denotes 0, 1 or 2.

10. Liquid-crystal display, characterised in that it contains a liquid-crystal medium according to claim 1.

11. Liquid-crystal display according to claim 10, characterised in that it is addressed by an active matrix.

12. A method comprising using a liquid-crystal medium according to claim 1 in a liquid-crystal display.

13. Process for the preparation of a liquid-crystal medium, characterised in that one or more compounds of the formula I according to claim 1 are mixed with one or more further compounds and optionally with one or more additives.

* * * * *

UNITED STATES PATENT AND TRADEMARK OFFICE
CERTIFICATE OF CORRECTION

PATENT NO. : 8,404,150 B2
APPLICATION NO. : 12/867571
DATED : March 26, 2013
INVENTOR(S) : Michael Wittek et al.

Page 1 of 1

It is certified that error appears in the above-identified patent and that said Letters Patent is hereby corrected as shown below:

In the Claims:

Column 90, line 21 reads "-C=C-", should read -- -C≡C- --.

Signed and Sealed this
Sixth Day of August, 2013

Teresa Stanek Rea
*Acting Director of the United States Patent and Trademark Office*